United States Patent
Balasubramanian et al.

(10) Patent No.: US 9,155,071 B2
(45) Date of Patent: *Oct. 6, 2015

(54) EMPLOYING A HOME BASE STATION IN A WIRELESS COMMUNICATION ENVIRONMENT

(71) Applicant: QUALCOMM Incorporated, San Diego, CA (US)

(72) Inventors: Srinivasan Balasubramanian, San Diego, CA (US); Raymond Tah-Sheng Hsu, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/730,388

(22) Filed: Dec. 28, 2012

(65) Prior Publication Data

US 2013/0114549 A1     May 9, 2013

Related U.S. Application Data

(63) Continuation of application No. 12/132,552, filed on Jun. 3, 2008, now Pat. No. 8,345,604.

(60) Provisional application No. 60/942,643, filed on Jun. 7, 2007.

(51) Int. Cl.
| | |
|---|---|
| *H04L 12/28* | (2006.01) |
| *H04W 72/04* | (2009.01) |

(Continued)

(52) U.S. Cl.
CPC .............. *H04W 72/04* (2013.01); *H04L 63/08* (2013.01); *H04L 63/164* (2013.01); *H04W 12/06* (2013.01); *H04W 84/045* (2013.01); *H04W 88/08* (2013.01)

(58) Field of Classification Search
USPC .................. 370/252, 329, 389, 401
See application file for complete search history.

(56) References Cited

U.S. PATENT DOCUMENTS

| 7,818,007 B2 | 10/2010 | Gallagher et al. |
| 8,185,935 B2 * | 5/2012 | Hsu .................. 726/3 |

(Continued)

FOREIGN PATENT DOCUMENTS

| RU | 2295841 C2 | 3/2007 |
| WO | 02085051 A1 | 10/2002 |

OTHER PUBLICATIONS

3GPP2 CS0016-C Section 3.5.7.1.2.1 "Over-the-Air Service Provisioning of Mobile Stations in Spread Spectrum Standards", version 1.0, Release C, Oct. 22, 2004.

(Continued)

*Primary Examiner* — John Pezzlo

(57) ABSTRACT

Systems and methodologies are described that effectuate establishment of an IPSec tunnel for utilization in a wireless communication environment. IPSec establishment procedures on home base stations can be used to establish IPSec tunnels between home base stations situated on open access sectors of wireless communication environments and packet data interworking function components positioned at the contiguity of secured segments of the wireless communication environments. Moreover, high rate packet data point-to-point protocol challenge-handshake authentication protocols can be directed through the IPSec tunnels to facilitate authentication of access terminals associated with the home base stations in order to facilitate further communications with components dispersed within secure areas of wireless communication environments. Further, international mobile subscriber identities (IMSI) affiliated with access terminals associated with home base stations can be used to identify packet data serving nodes with which to establish communications between home base stations and packet data serving nodes.

17 Claims, 15 Drawing Sheets

(51) Int. Cl.
*H04L 29/06* (2006.01)
*H04W 12/06* (2009.01)
*H04J 1/16* (2006.01)
*H04W 84/04* (2009.01)
*H04W 88/08* (2009.01)

(56) References Cited

U.S. PATENT DOCUMENTS

| | | |
|---|---|---|
| 8,345,604 B2 | 1/2013 | Balasubramanian et al. |
| 2005/0213555 A1 | 9/2005 | Eyuboglu et al. |
| 2006/0130136 A1 | 6/2006 | Devarapalli et al. |
| 2006/0149814 A1 | 7/2006 | Borella |
| 2006/0203774 A1 | 9/2006 | Carrion-Rodrigo |
| 2008/0089272 A1* | 4/2008 | Ahokangas ............ 370/328 |
| 2008/0117884 A1* | 5/2008 | Ishii et al. ............ 370/338 |
| 2008/0130564 A1 | 6/2008 | Gallagher et al. |
| 2008/0130568 A1 | 6/2008 | Gallagher et al. |

OTHER PUBLICATIONS

3GPP2 CS0016-C Section 3.5.7.1.5 "Over-the-Air Service Provisioning of Mobile Stations in Spread Spectrum Standards", version 1.0, Release C, Oct. 22, 2004.
International Search Report and Written Opinion—PCT/US2008/066203—ISA/EPO—May 13, 2009.
Taiwan Search Report—TW097121350—TIPO—Feb. 6, 2012.

* cited by examiner

EMPLOYING A HOME BASE STATION IN A WIRELESS COMMUNICATION ENVIRONMENT

CROSS-REFERENCE TO RELATED APPLICATIONS

This Application for Patent is a continuation of and claims the benefit of U.S. application Ser. No. 12/132,552 entitled "EMPLOYING A HOME BASE STATION IN A WIRELESS COMMUNICATION ENVIRONMENT," which was filed Jun. 3, 2008, issued as U.S. Pat. No. 8,345,604 on Jan. 1, 2013, as well as U.S. Provisional Patent Application Ser. No. 60/942,643 entitled "HOME BASE STATION" which was filed on Jun. 7, 2007, now expired. The entirety of the aforementioned applications are assigned to the Assignee are and herein incorporated by reference.

BACKGROUND

I. Field

The following description relates generally to wireless communications, and more particularly to base stations in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, interference, time slot, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

There are many occasions where mobile communications devices, such as smart phones, cell phones, and the like, lose connectivity with the macro cellular network to which they are members. This is especially the case where the mobile or portable device is taken into homes or business establishments where cellular communication coverage is sparse at best. The subject matter as claimed is directed toward resolving or at the very least mitigating one or all the problems elucidated above.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The claimed subject matter in accordance with a various aspects disclosed herein provides architectures that collapse the BTS/BSC/PCF functionalities into a single entity referred to as a home base station. The home base station can utilize or employ an A10 connection established between the home base station and a cellular network packet data internetworking function thereby providing seamless handover from the home base station to cellular networks. Moreover, in accordance with further aspects, the claimed matter can employ an A11 concentrator that allows for consolidating A11 connections thus reducing the impact to the cellular system packet data switching aspects. Additionally, through utilization of the facilities and functionalities engineered by the home base station other interfaces (e.g., A13, A16, A17, A18, A19, A21) that enable and/or facilitate mobile connectivity to the macro cellular network can be instituted and/or utilized.

In accordance with one or more embodiments and corresponding disclosure thereof, various aspects are described in connection with facilitating or effectuating establishment of an IPSec tunnel for utilization in a wireless communication environment. In accordance with an aspect, the claimed subject matter includes a method that effectuates establishment of a IPSec tunnel for utilization in a wireless communication environment, comprising utilizing IPSec establishment procedures on a home base station to establish the IPSec tunnel between the home base station and a packet data interworking function component, the IPSec establishment procedures based at least in part on a user, across all users, or based on a quality of service (QoS), employing at least one of a high rate packet data (HRDP) point-to-point protocol (PPP) challenge-handshake authentication protocol (CHAP) or non-access stratum (NAS) based support directed through the IPSec tunnel to authenticate an access terminal associated with the home base station, utilizing an international mobile subscriber identity (IMSI) associated with the access terminal to identify or select a packet data serving node with which to establish communications between the home base station and the packet data serving node, and employing A11 signaling to establish an A10 connection with the packet data serving node.

In accordance with yet a further aspect, the claimed subject matter includes a wireless communication apparatus that establishes and IPSec tunnel utilized in a wireless communication environment. The wireless communication apparatus includes means for employing an IPSec establishment procedure on a means for establishing the IPSec tunnel between the means for establishing the IPSec tunnel and a means for intermediating communication between a secure sector of the wireless communication environment and an unguarded sector of the wireless communication environment wherein the IPSec establishment procedure based at least in part on a user, across all users, a quality of service (QoS), means for employing one or more of a high rate packet data (HRDP) point-to-point protocol (PPP) challenge-handshake authentication protocol (CHAP) or non-access stratum (NAS) based support directed through the IPSec tunnel to authenticate a means for mobile communicating associated with the means for establishing the IPSec tunnel, means for utilizing an international mobile subscriber identity (IMSI) associated with the means for mobile communicating to identify or select a means for serving packet data with which to establish communications between the means for establishing the IPSec tunnel and the means for serving packet data, and means for employing A11 signaling to establish an A10 connection with the means for serving packet data.

In accordance with a further aspect, the claimed matter includes wireless communications apparatus that comprises a memory that retains instructions related to using IPSec establishment procedures to establish an IPSec tunnel extending from a home base station to a packet data interworking function, directing high rate packet data (HRDP) point-to-point protocol (PPP) challenge-handshake authentication protocol (CHAP) through the IPSec tunnel to authenticate an access terminal associated with the home base station with a secure wireless communication environment, identifying a packet data serving node based at least in part on an international mobile subscriber identity (IMSI) associated with the access terminal, establishing dynamic data interchange between the packet data serving node and the home base station, and establishing an A10 connection with the packet data serving node using A11 signaling; and a processor, coupled to the memory, configured to execute the instructions retained in the memory.

The claimed matter in accordance with a further aspect includes a machine-readable medium having stored thereon machine-executable instructions for utilizing IPSec establishment procedures on a home base station to establish an IPSec tunnel between a home base station and a packet data interworking function component, the IPSec establishment procedures based at least in part on a user, across all users, or quality of service (QoS) attributes, employing at least one of a high rate packet data (HRDP) point-to-point protocol (PPP) challenge-handshake authentication protocol (CHAP) or non-access stratum (NAS) support directed through the IPSec tunnel to authenticate an access terminal associated with the home base station, utilizing an international mobile subscriber identity (IMSI) associated with the access terminal to identify or select a packet data serving node with which to establish communications between the home base station and the packet data serving node, and employing A11 signaling to establish an A10 connection with the packet data serving node.

Moreover, the claimed matter in accordance with a further aspect can, in a wireless communications system, include an apparatus comprising: a processor configured to: utilize IPSec establishment procedures on a home base station to establish an IPSec tunnel between a home base station and a packet data interworking function component wherein the IPSec establishment procedures based in part on a user, across a plurality of users, or a quality of service (QoS) attribute, employ one or more of a high rate packet data (HRDP) point-to-point protocol (PPP) challenge-handshake authentication protocol (CHAP) or non-access stratum (NAS) based support directed through the IPSec tunnel to authenticate an access terminal associated with the home base station, utilize an international mobile subscriber identity (IMSI) associated with the access terminal to identify or select a packet data serving node with which to establish communications between the home base station and the packet data serving node; and employ A11 signaling to establish an A10 connection with the packet data serving node.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
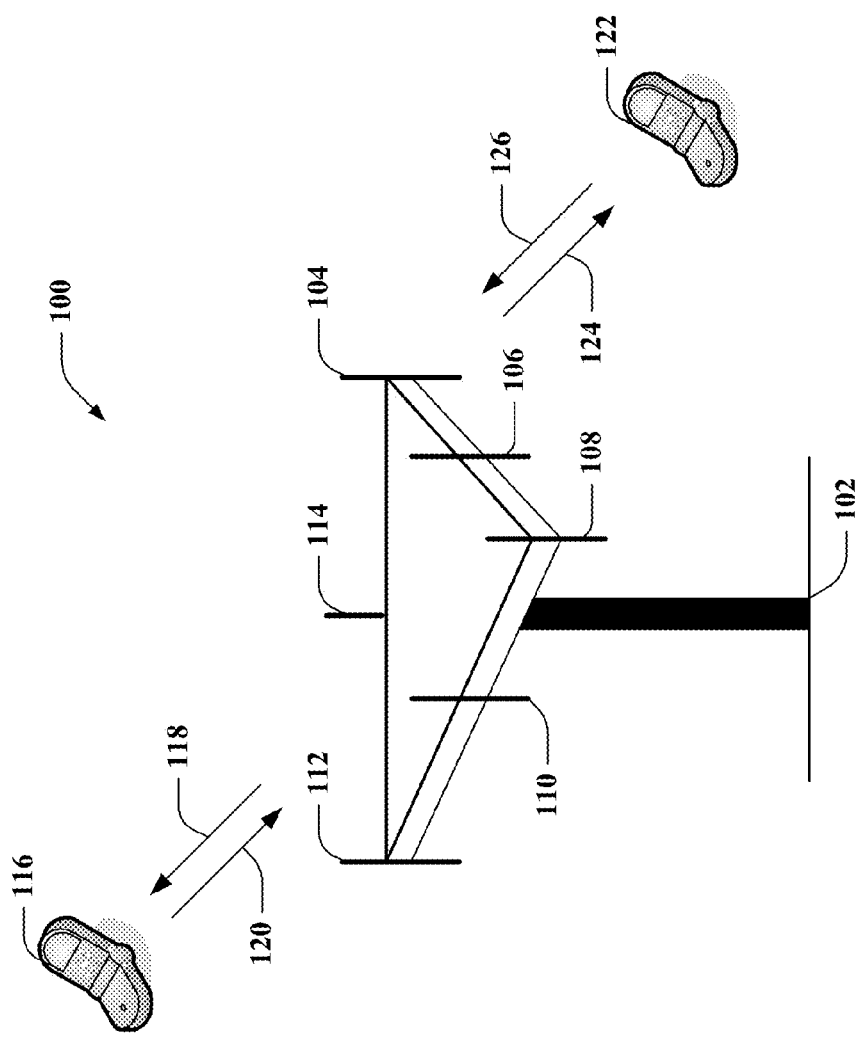
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The claimed subject matter in accordance with an aspect provides architectures that collapse the BTS/BSC/PCF functionalities into a single entity referred to herein as a home base station. The home base station can utilize or employ an A10 connection established between the home base station and a cellular network packet data internetworking function thereby providing seamless handover from the home base station to cellular networks. Moreover, in accordance with a further aspect, the claimed matter can employ an A11 concentrator that allows for consolidating A11 connections thus reducing the impact to the cellular system packet data switching aspects. In accordance with further aspects of the claimed matter, the connectivity and functionalities instituted by the home base station can be exploited to enable and utilize other interfaces (e.g., A13, A16, A17, A18, A19, A21, etc.) included and/or defined in a cellular system or network definition (e.g., 3GPP2) without modification.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can be a home base station environment, for instance. In such system 100, base station 102 can be deployed in a home or small business/enterprise network environment, for example. Through utilization of the claimed subject matter, extant functionalities and features typically associated with $3^{rd}$ Generation (3G) cellular systems and/or networks can be extended to base station 102 situated in the home or small business/enterprise network environment, thereby providing improved interoperability between the greater macro network (e.g., the 3G system and/or network as a whole) and the localized home or small business/enterprise network environment within which base station 102 is situated.

Where base station 102 is situated within the home or small business/enterprise network environment it can be positioned therein to serve two purposes. First, base station 102 can be positioned within the home or small enterprise/business network environment in order to provide 3G system and/or network coverage extension and second, base station 102 can be included within a home or small enterprise/business network environment in order to provide peak 3G throughput rates for individual users of system 100. Moreover, the approach adopted and employed by the claimed subject matter can influence users of system 100, wherever possible, to employ base station 102 in preference to the greater macro network (e.g., the 3G system and/or network). For instance, when base station 102 is situated within, or associated with, a home or small business/enterprise network environment the home owner or small business/enterprise proprietor can, for a small monthly fee (paid to the provider of base station 102), acquire unlimited usage minutes for utilization of base station 102 through which the greater macro network can be accessed without additional charge.

Placing base station 102 on existing interchange media that transports network traffic between distributed sites and more centralized points of presence (e.g., a backhaul) obviates or mitigates the need to utilize T1 connections to the home or small business/enterprise network environment, and more particularly forestalls the need to deploy T1 connections to base station 102. Rather, the claimed subject matter can employ existing DSL (Digital Subscriber Loop/Line and/or its variants)/Cable modem connections in conjunction with base station 102 to transport packets over the backhaul. Such deployment can provide savings for operators (e.g., home users and small business or enterprise proprietors). Nevertheless, existing technologies on their own typically are inadequate to facilitate or effectuate the interconnectivity between 3G wireless networks and conventional residential and/or business local area networks. For instance, extant access terminals 116 and 122 employing frequency division duplex (FDD) or time division duplex (TDD) technologies are typically and currently unable to take advantage of wireless networking technologies that employ IEEE 802.11 standards (e.g., Wi-Fi); existing cellular mobile technologies generally cannot take advantage of Wi-Fi systems. Moreover, devices that utilize or are based upon the IEEE 802.11 paradigm, such as, for example, DSL or cable modems, generally are incapable of sustaining speeds in excess of 300 KB/second and further the over-the-air (wireless) capacity of these systems is generally limited to 3.1 MB/second. Thus, backhaul speeds in these systems have been perceived as being slower than over-the-air speeds with the consequential result that to date there has not been a necessity for access terminals (e.g., access terminals 116 and 122) to utilize technologies that have employed the IEEE 802 standards.

Figure 2:
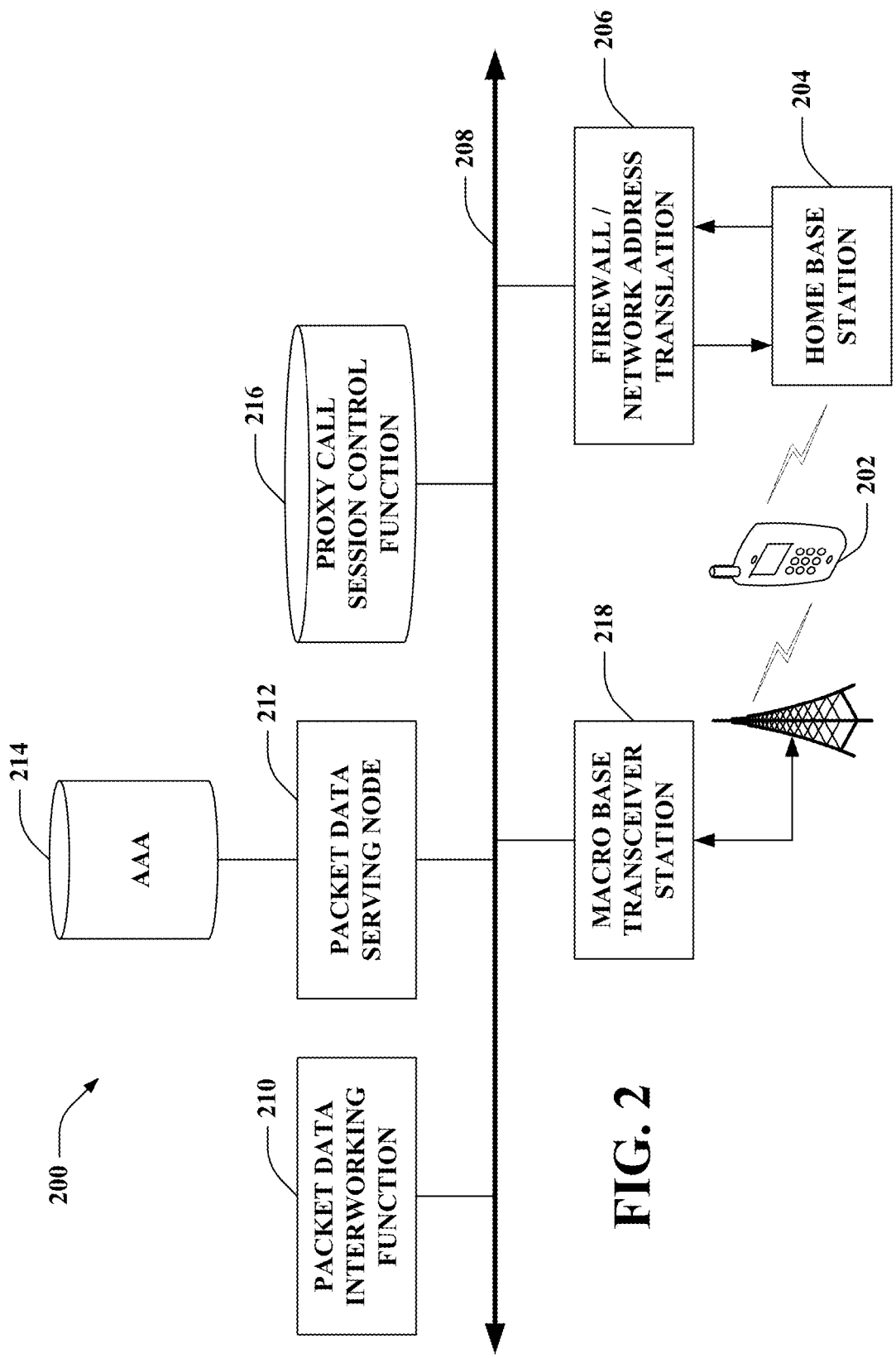
FIG. 2 is an illustration of an example network architecture that employs a home base station in a wireless communication environment.

FIG. 2 depicts an illustrative network architecture 200 in accordance with an aspect of the claimed matter. Network architecture 200 as illustrated can include access terminal 202 that can be in continuous and/or operative or sporadic and/or intermittent communication with home base station 204 and/or with the greater cellular system or network (e.g., $3^{rd}$ Generation (3G) cellular systems) as indicated by macro base transceiver station 218. Access terminal 202, as exemplified above in context with access terminals 116 and 122, can be implemented entirely in hardware and/or a combination of hardware and/or software in execution. Further, access terminal 202 can be incorporated within and/or be associated with other compatible components. Additionally, access terminal 202 can be, but is not limited to, any type of machine that includes a processor and/or is capable of effective communication with network topology 208. Illustrative machines that can comprise access terminal 202 can include desktop computers, cellular phones, smart phones, laptop computers, notebook computers, Tablet PCs, consumer and/or industrial devices and/or appliances, hand-held devices, personal digital assistants, multimedia Internet mobile phones, multimedia players, and the like.

Network architecture 200 can further include home base station 204 that through utilization of the facilities set forth herein extends functionalities currently extant within a cellular network (e.g., $3^{rd}$ Generation cellular system) into the home network environment or small business enterprise network environment. Positioning home base station 204 within the home network or small business enterprise network can provide improved interoperability between the cellular network and the local area IEEE 802 based networking (wired and/or wireless) environment typical in such home and/or business networks. Moreover, situating home base station 204 within the home network or small business enterprise network provides for cellular system and/or network coverage extension to the home or small enterprise network and affords peak cellular throughput rates for individual users of the enterprise/business network environment. Furthermore, utilization of home base station 204 by access terminal 202 can influence users of network architecture 200 to, wherever possible, to utilize home base station 204 in preference to the cellular network whenever access terminal 202 is within the ambit of home base station 204.

Additionally, positioning or associating home base station 204 with existing communication modalities (e.g., IEEE 802 based technologies) that transport network traffic between distributed sites and/or more centralized points of presence can dispense with the need to establish extraneous T1 connectivity beyond that currently available in the home/small business/enterprise network environment. Rather, home base station 204 can employ existing DSL/cable modem connectivity to transport packets over existing communication instrumentalities within and between the home/small business/enterprise network, distributed sites and/or more centralized points of presence. Deployment or association of the home base station 204 in conjunction with extant and available IEEE 802.11 based communication instrumentalities can therefore provide pecuniary savings to the home user and/or small enterprise entrepreneur.

In addition, network architecture 200 can further include firewall/network address translation (NAT) component 206 that inspects network traffic traversing through it and denies or permits passage based on a set of prescribed rules. Firewall/network address translation (NAT) component 206 in effect regulates the flow of traffic between computer networks of different trust levels such as between network segments affiliated with zones of no trust (e.g., the Internet) and network segments associated with zones of higher trust (e.g., enterprise intranets). Additionally and/or alternatively, firewall/network address translation (NAT) component 206 can also facilitate network address translation (e.g., network masquerading, native address translation, or Internet Protocol (IP) masquerading) whereby firewall/network address translation (NAT) component 206 rewrites the source and/or destination IP addresses and/or the Transmission Control Protocol/User Datagram Protocol (TCP/UDP) port numbers of IP packets transiting through firewall/network address translation (NAT) component 206. Typically, firewall/network address translation (NAT) component 206 can be implemented or effectuated entirely in hardware and/or as a combination of hardware and/or software in execution. Further, firewall/network address translation (NAT) component 206 can be, but is not limited to, any type of mechanism, machine, device, facility, and/or instrument that includes a processor and/or is capable of effective and/or operative communications with network topology 208. Mechanisms, machines, devices, facilities, and/or instruments that can comprise firewall/network address translation (NAT) component 206 can include Tablet PC's, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Network topology 208 can include any viable communication and/or broadcast technology, for example, wired and/or wireless modalities and/or technologies can be utilized to effectuate the claimed subject matter. Moreover, network topology 208 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. Network topology 208 can provide the facilities and functionalities necessary to interconnect and/or provide data interchange between the various and disparate components included and depicted in connection with network architecture 200. Moreover, as will be readily appreciated by those reasonably skill in the art, network topology 208, rather than being a single monolithic entity, can be composed of multiple segments or fragments (e.g., intranets, extranets, and the like) access to some, but not necessarily all, sections or subsections being limited to identified and/or identifiable individuals and/or or utilization.

Packet data interworking function (PDIF) component 210 can also be included within network architecture 200 and generally can be responsible for functions such as providing access to packet data services, implementing end-to-end tunnels, allocating IP addresses, encapsulating and de-encapsulating traffic, facilitating user authentication, and the like. Packet data interworking function (PDIF) component 210, which is referred to as the packet data gateway (PDG) under the 3GPP specification, typically is positioned at the boundary between the core network of a cellular communications system and the public Internet. Generally, the packet data interworking function (PDIF) component 210 can be thought of as being the protector of the cellular communications system from intrusions from the general IP domain at large. Accordingly, any entity (e.g., access terminal 202) that needs to communicate or gain access with the core network of a cellular communications system needs to establish communications with and/or through packet data interworking function (PDIF) component 210, and more particularly, needs to take measures to initiate IPSec (IP security) tunnels in correspondence with packet data interworking function (PDIF) component 210. Packet data interworking function (PDIF) component 210 can be effectuated entirely in hardware and/or a combination of hardware and/or software in execution. Further, packet data interworking function (PDIF) component 210 can be incorporated within and/or be associated with other compatible components. Additionally, packet data interworking function (PDIF) component 210 can be, but is not necessarily limited to, any type of machine that includes a processor and/or is capable of effective communication with network topology 208. Illustrative machines that can comprise packet data interworking function (PDIF) component 210 can include desktop computers, cellular phones, smart phones, laptop computers, notebook computers, Tablet PCs, consumer and/or industrial devices and/or appliances, hand-held devices, personal digital assistants, multimedia Internet mobile phones, multimedia players, and the like.

Packet data serving node (PDSN) component 212 as depicted within network architecture 200 can typically be responsible for the establishment, maintenance, and termination of point-to-point protocol (PPP) sessions between itself and one or more access terminal 202. Moreover, packet data serving node (PDSN) component 212 can also assign dynamic Internet Protocol (IP) addresses in addition to supporting mobile Internet Protocol (IP) functionality. Further, packet data serving node (PDSN) component 212, similar to those components disclosed thus far, can be, implemented and/or effectuated entirely in hardware and/or as a combination of hardware and/or software in execution. Furthermore, packet data serving node (PDSN) component 212 can be, but is not limited to, any type of engine, machine, instrument of conversion, or mode of production that includes a processor and/or is capable of effective and/or operative communications with network topology 208. Illustrative instruments of conversion, modes of production, engines, mechanisms, devices, and/or machinery that can comprise and/or embody packet data serving node (PDSN) component 212 can include desktop computers, server class computing devices and/or databases, cell phones, smart phones, laptop computers, notebook computers, Tablet PCs, consumer and/or industrial devices and/or appliances and/or processes, hand-held devices, personal digital assistants, multimedia Internet enabled mobile phones, multimedia players, and the like.

Additionally, network architecture 200 can further include access, authentication, and accounting (AAA) component 214 that can be associated with packet data serving node (PDSN) component 212. Access, authentication, and accounting (AAA) component 214 provides access, authorization, and audit facilities that can include utilization of biometric scans, digital signatures, encryption, and the like, in order to determine the identity and privileges of those individuals attempting to gain access to secure segments of network topology 208 (e.g., corporate internet, a $3^{rd}$ Generation cellular network, and the like) and to track activities of those individuals who are granted access to secure segments of network topology 208. Once again, like the previous components disclosed herein, access, authentication, and accounting (AAA) component 214 can be implemented and/or effectuated entirely in hardware and/or as a combination of hardware and/or software in execution. Moreover, access, authentication, and accounting (AAA) component 214 can be, but is not limited to, any type of mechanism, machine, device, facility, and/or instrument that includes a processor and/or is capable of effective and/or operative communications with packet data serving node (PDSN) component 212 and/or network topology 208. Mechanisms, machines, devices, facilities, and/or instruments that can comprise access, authentication, and accounting (AAA) component 214 can include Tablet PC's, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

As illustrated, network architecture 200 can also include proxy call session control function (P-CSCF) component 216, an IP multimedia subsystem (IMS) that typically identified as the first contact point that access terminal 202 makes within an IP multimedia core network system. Typical functions provided by proxy call session control function (P-CSCF) component 216 can include forwarding session initiation protocol (SIP) messages received from access terminal 202 and forwarding these messages, depending on the type of message and/or procedure being carried out, to other components situated and included in the core network. Once again like previously disclosed components associated with network architecture 200, proxy call session control function (P-CSCF) component 216 can be implemented entirely in hardware and/or as a combination of hardware and/or software in execution. Additionally, proxy call session control function (P-CSCF) component 216 can be, but is not limited to, any type of mechanism, machine, device, facility, and/or instrument that includes a processor and/or is capable of effective and/or operative communications with network topology 208. Mechanisms, machines, devices, facilities, and/or instruments that can comprise proxy call session control function (P-CSCF) component 216 can include Tablet PC's, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

In addition, network architecture 200 can further include macro base transceiver station component 218 that receives and/or transmits radio signals and/or has capabilities for encrypting and/or decrypting communications with base station controllers. Macro base station transceiver station component 218 typically terminates the radio or wireless interface between access terminals 202 and other wired or ground based components of network architecture 200. Macro base station transceiver station component 218 like other components of network architecture 200 discussed supra can be implemented or effectuated entirely in hardware and/or as a combination of hardware and/or software in execution and can be any type of engine, machine, instrument of conversion, or mode of production that includes a processor and/or is capable of effective and/or operative communications with network topology 208.

Figure 3:
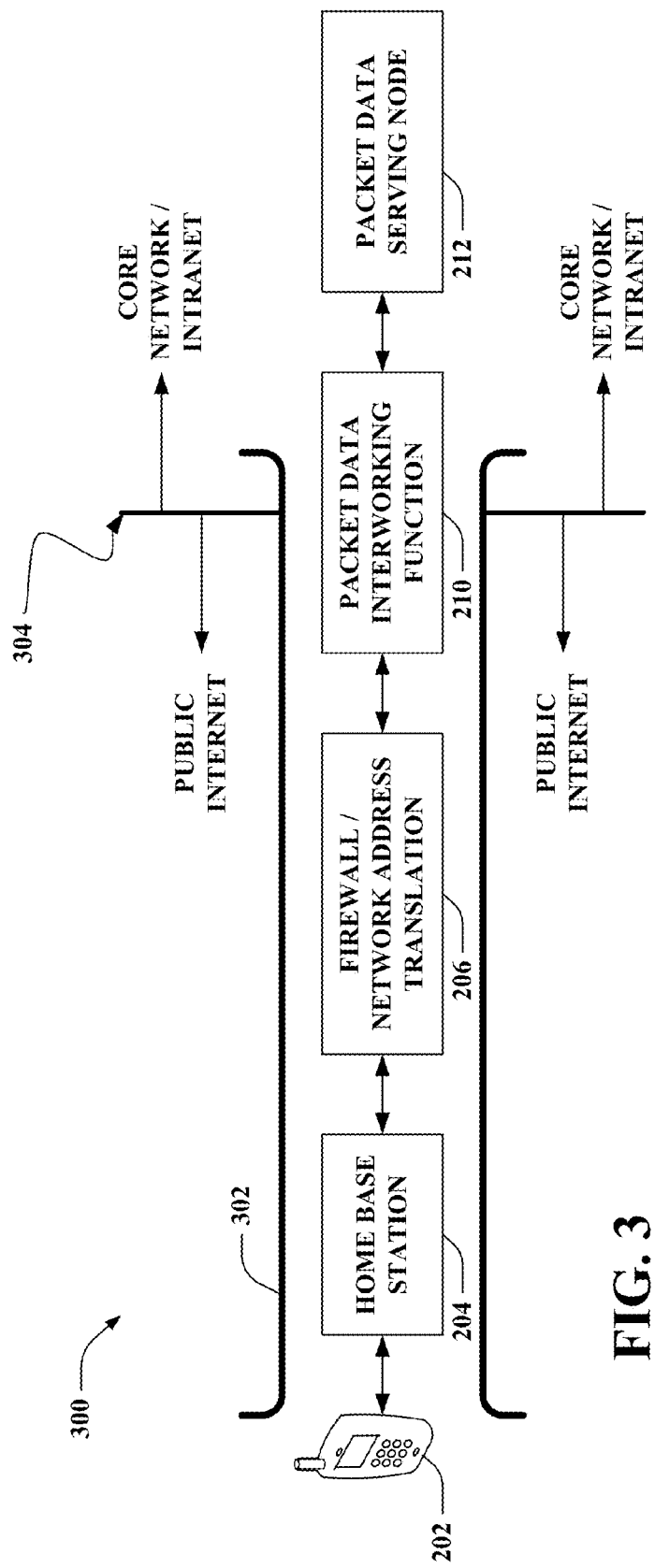
FIGS. 3-5 illustrate example network architectures that employ home base stations in a wireless communication environment.

FIG. 3 depicts a network architecture 300 that facilitates and effectuates an aspect of the claimed subject matter. Network architecture 300 can include access terminal 202, home base station 204, firewall/network address translation (NAT) component 206, packet data interworking function (PDIF) component 210, and packet data serving node (PDSN) component 212. Because much of the configuration and operation of the aforementioned components is substantially similar to those described with respect to components discussed in relation to FIG. 2, a detailed description of such features has been omitted to avoid needless prolixity and for the sake of brevity and conciseness. Nevertheless, network architecture 300 can include tunnel aspect 302, for example, an IPSec tunnel, construction or establishment of which can be instigated by access terminal 202. Tunnel aspect 302 in accordance with an aspect of the claimed subject matter, and as illustrated in FIG. 3, can extend from access terminal 202 to packet data interworking function component 210, and can include home base station 204 and firewall/network address translation (NAT) component 206. Typically under the conception exemplified by network architecture 300, access terminal 202 needs to be cognizant or aware that it is in communication with a home base station (e.g., home base station 204) rather than a macro base transceiver station (e.g., macro base transceiver station 218) and based at least in part on this cognition access terminal 202 can initiate IPSec tunnel establishment procedures to institute fabrication or establishment of tunnel aspect 302. Upon establishment of tunnel aspect 302, tunnel aspect 302 can effectively and/or seamlessly link access terminal 202 with packet data interworking function component 210 with the consequential result that data interchange or communications between access terminal 202 and components and devices situated beyond the public Internet-core network/intranet periphery 304 (e.g., within the $3^{rd}$ Generation core network) can take place as if the public Internet-core network/intranet boundary 304 were completely transparent rather than darkly opaque (e.g., a perceptible barrier or hurdle to seamless intercommunication, as is extant currently).

Figure 4:
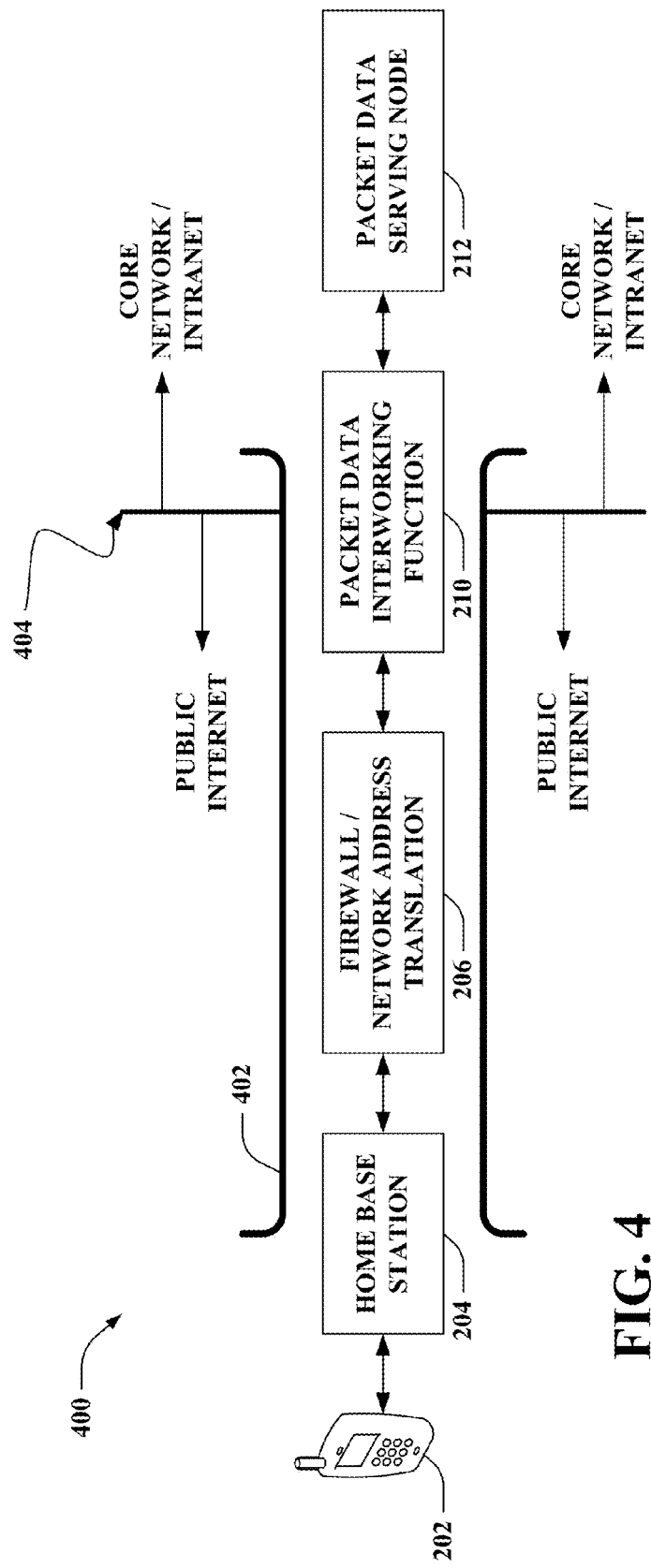

FIG. 4 illustrates a further network architecture 400 that effectuates and facilitates an aspect of the claimed subject matter. Like network architecture 300 exemplified in FIG. 3, network architecture 400 can include access terminal 202, home base station 204, firewall/network address translation (NAT) component 206, packet data interworking function (PDIF) component 210, and packet data serving node (PDSN) component 212. As will be readily appreciated by those cognizant in this field of endeavor, access terminal 202, home base station 204, firewall/network address translation (NAT) component 206, packet data interworking function (PDIF) component 210, packet data serving node (PDSN) component 212 can typically be connected via a wired or wireless communication modality, such as network topology 208. Moreover, as will be further appreciated by those of ordinary skill in the art, because much of the configuration and operation of the aforementioned components are substantially similar to those elucidated with respect to components discussed in the context of FIG. 2 and FIG. 3, detailed description of such features have been omitted to avoid needless repetition and for the sake of conciseness. Nonetheless, network architecture 400 can also include tunnel aspect 402, for instance, an IPSec tunnel that can be established between and by home base station 204 and packet data interworking function (PDIF) component 210. In this instance, access terminal 202 is typically unaware that it has moved within the purview of a home base station (e.g., home base station 204) or that it is communicating with a home base station (e.g., home base station 204). All that access terminal 202 is generally concerned about under this aspect of the claimed subject matter is that tunnel aspect 402 has been established by the home base station (e.g., home base station 204) and that it (e.g., access terminal 202) is able to utilize tunnel aspect 402 in order to seamlessly communicate with devices and/or components dispersed beyond or behind the public Internet-core network/intranet boundary 404.

Accordingly, home base station 204 can generally be tasked with establishing tunneling aspect 402 (e.g., utilizing IPSec tunnel establishment policies) between home base station 204 to packet data interworking function component 210. As illustrated tunneling aspect 402 perforates the extant barrier (e.g., the public Internet-core network intranet demarcation 404) between the public Internet at large and the protected core cellular network (e.g., $3^{rd}$ generation cellular system or network) thereby providing seamless interconnectivity between access terminal 202 and packet serving node component 212; an interconnectivity typically not permissible without the facilities and functionality provided by the claimed subject matter.

Once tunneling aspect 402 has been established, linking home base station 204 with packet data interworking function component 210 through firewall/network address translation (NAT) component 206, the radio link between access terminal 202 and the protected cellular core network will generally be exactly the same as it was had access terminal 202 been communicating with the cellular core network through macro base transceiver station 218.

Home base station 204 (e.g., called Home Node B under the 3GPP specification), once tunneling aspect 402 has been established between home base station 204 and packet data interworking function 210, can ship packets into the cellular network (e.g., to packet data serving node 212 and/or proxy call session control function component 216 positioned beyond the public Internet-core network/intranet barrier 404) through tunneling aspect 402. Home base station 204 in order to effectuate construction of tunneling aspect 402 generally needs to supply a set of credentials uniquely associated with the home base station and further that provides transparency with respect to the multiple users that can utilize home base station 204 in order to interact with the cellular network.

To facilitate the foregoing a packet data serving aspect responsible for establishing, maintaining, and terminating point-to-point protocol (PPP) sessions and assigning dynamic Internet Protocol (IP) addresses in addition to supporting mobile Internet Protocol (IP) functionality can typically be included or associated with home base station 204. Inclusion or association of a packet data serving functionality with home base station 204, from the perspective of access terminal 202, makes home base station 204 appear functionally identical to macro base transceiver station 218. With regard to point-to-point protocol (PPP) it should be noted that it can have two parts: (1) a control part LCP/IPCP that can be used to authenticate and assign IP addresses to the access terminal in 3GPP2. In 3GPP this function can be done by a control protocol defined as NAS (Non-Access Stratum); and (2) HDLC framing which is performed to demark IP packet boundaries. Generally this is required for 3GPP2. 3GPP uses packet based framing at the RLC layer to demark IP packets and generally does not need this function.

Figure 5:
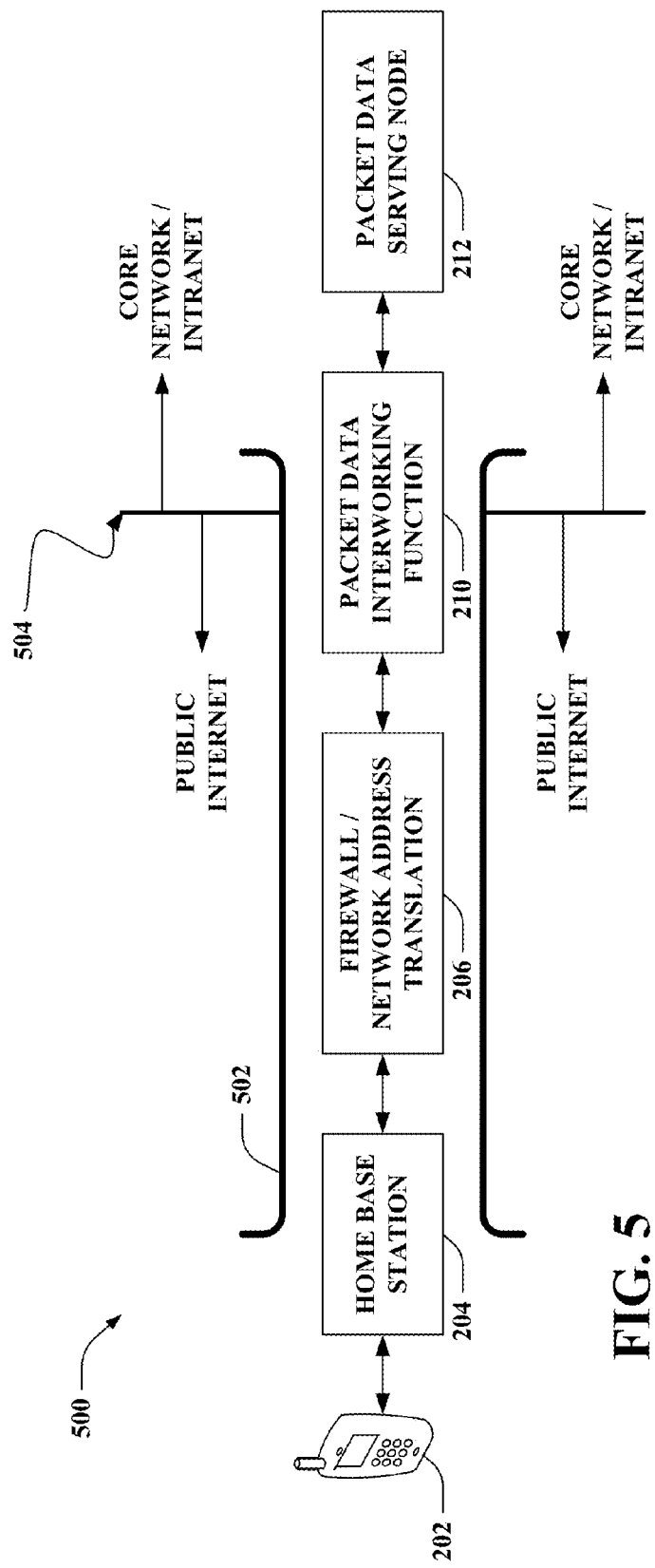

FIG. 5 exemplifies a further network architecture 500 that facilitates and effectuates an aspect of the subject matter as claimed. Network architecture 500 can include access terminal 202, home base station 204, firewall/network address translation (NAT) component 206, packet data interworking function (PDIF) component 210, and packet data serving node component 212. As will be understood by those moderately cognizant in this field of endeavor, packet data interworking function (PDIF) component 210 can be positioned at the contiguity that exists between the public Internet and the core cellular network/intranet (e.g., public Internet-core network/intranet boundary 504) and that packet data serving node component 212 is typically situated within the protected core cellular network rather than being placed in the public Internet at large. Moreover, as will be further appreciated by those ordinarily skilled in the art, intercommunication between the various devices and components that can comprise both the public Internet and/or the core cellular network/intranet can be carried out by wired and/or wireless communication instrumentalities. Additionally, as will also be understood by those of ordinary skill in the art, tunnels linking packet data interworking function (PDIF) component 210 with home base station 204 can be established on a per user basis, or can be performed across all users, or differentiated based at least in part on disparate traffic types (e.g., Quality of Service (QoS)).

As stated in connection with FIGS. 2-4 above, since much of the configuration and functionalities of the aforementioned components are substantially similar to those previously described in connection with FIGS. 2-4, a detailed description of such features and facilities has been omitted for the sake of brevity. Nevertheless, network architecture 500 can include tunnel 502, for instance, an IPSec tunnel, than can be established to link home base station 204 with packet data interworking function component 210. In this instance, home base station 204 can host base transceiver, base station controller, and/or packet control function (e.g., BTS/BSC/PCF) instrumentalities, but unlike the approach posited in relation to FIG. 4, the packet data serving functionality is absent from home base station 204; rather actual packet data serving mediation can be facilitated by packet data serving node 212 situated within the core cellular network/intranet.

Thus, in contrast to the implementation set forth with respect to FIG. 4, where the home base station 204 communicates by way of Internet Protocol (IP) packets within the tunneling aspect 402 established from the home base station 204 to the packet data interworking function component 210, under the conception provided by FIG. 5 the interchange employs point-to-point protocol (PPP) inside tunnel 502 so that the point-to-point protocol (PPP) termination point is at packet data serving node component 212. Consequentially, given that packet data serving node component 212 is generally situated behind public Internet-core network/intranet circumscription 504 (e.g., packet data serving node component 212 is typically positioned on the macro cellular network rather than in the milieu that can comprise the public Internet) the point-to-point protocol (PPP) is being extended all the way into the macro cellular core network rather than being intermediated by the packet data interworking function component 210.

It should be noted, and as will be apparent to those moderately cognizant in this field of endeavor, that once tunnel 502 has been furnished by home base station 204, connecting home base station 204 with packet data interworking function component 210, various aspects of tunnel 502 can be utilized to enable the plethora of interfaces specified in the macro cellular system specification. For instance, A13 interfaces that carry signaling information between the SC/MM function in a source access node (AN) and the SC/MM function in the target access node (AN) for dormant state session transfer. As further illustration, A16 interfaces can be utilized through tunnel 502 established between home base station 204 and packet data interworking function component 210. A16 interfaces typically carry signaling information between a source access node (AN) and a target access node (AN) for high rate packet data (HRPD) Inter-AN Connected State Session Transfer (e.g., hard handoff).

Additionally, tunnel 502 can also support A17, A18, A19, and/or A21 interfaces. A11 interfaces generally carry signaling information between a source access node (AN) and a target access node (AN) to manage resources in support of inter-AN cross-connectivity (soft/softer handoff). The A17 interface typically establishes dedicated endpoints for A18 and A19 interfaces. Additionally, the A17 interface tunnels air interface forward control channel signaling messages from the source access node (AN) to a target access node (AN) that has sectors in the access terminal's Active Set to be transmitted to the access terminal A18 interfaces generally transport user traffic (e.g., air interface traffic channel data) for an access terminal between the source access node (AN) and a target RT during cross-connectivity. The A18 interface endpoints are typically set up using an A17 interface. A19 interfaces generally carry remote transmitter (RT)-specific bearer-related cross-connectivity control messages for an access terminal between the access node (AN) and a target remote transmitter (RT). The A19 interface endpoints are normally set up using the A17 interface. A21 interfaces can carry signaling information between a high rate packet data (HRPD) access node (AN) and the indoor wireless system (IWS). A21 interfaces can provide for handoff to 1×.

Figure 6:
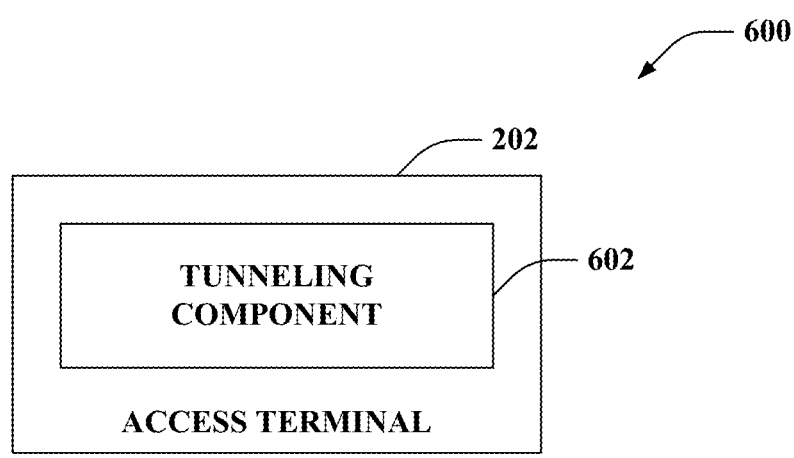
FIG. 6 is an illustration of an example access terminal that establishes a tunnel through a home base station in accordance with various aspects of the subject disclosure.

FIG. 6 provides depiction 600 of an access terminal 202 in accordance with an aspect of the claimed subject matter. As has been discussed supra with regard to FIGS. 1 and 2, access terminal 202 can have basic functionality similar to that elucidated in connection with access terminals 116 and 122, above, and as such these basic functionalities have been omitted for purposes of conciseness.

Nevertheless, in addition to the basic functionalities, access terminal 202 can also include a tunneling component 602 that can be utilized to establish a tunnel (e.g., IPSec tunnel) extending from access terminal 202 to packet data interworking function component 210. Typically, the tunnel established by tunneling component 602 can include utilization of home base station 204 and firewall/network address translation (NAT) component 206. Under this aspect of the claimed subject matter, tunneling component 602 needs to be aware, be made aware, or become aware, that it is communicating with a home base station (e.g., home base station 204) rather than a macro base transceiver station (e.g., macro base transceiver station 218). Thus, where tunneling component 602 is aware, or becomes aware, that it is communicating with a home base station (e.g., home base station 204) rather than a macro base transceiver station (e.g., macro base transceiver station 218), tunneling component 602 can commence IPSec tunnel establishment procedures to establish a tunnel between access terminal 202 and packet data interworking function component 210.

Once tunneling component 602 has facilitated or effectuated establishment of a tunnel between access terminal 202 and packet data interworking function component 210, intercommunication between access terminal 202 and components and devices situated on the core cellular network can take place in a seamless manner; as if the barrier between the public Internet and the core cellular were non-existent.

Figure 7:
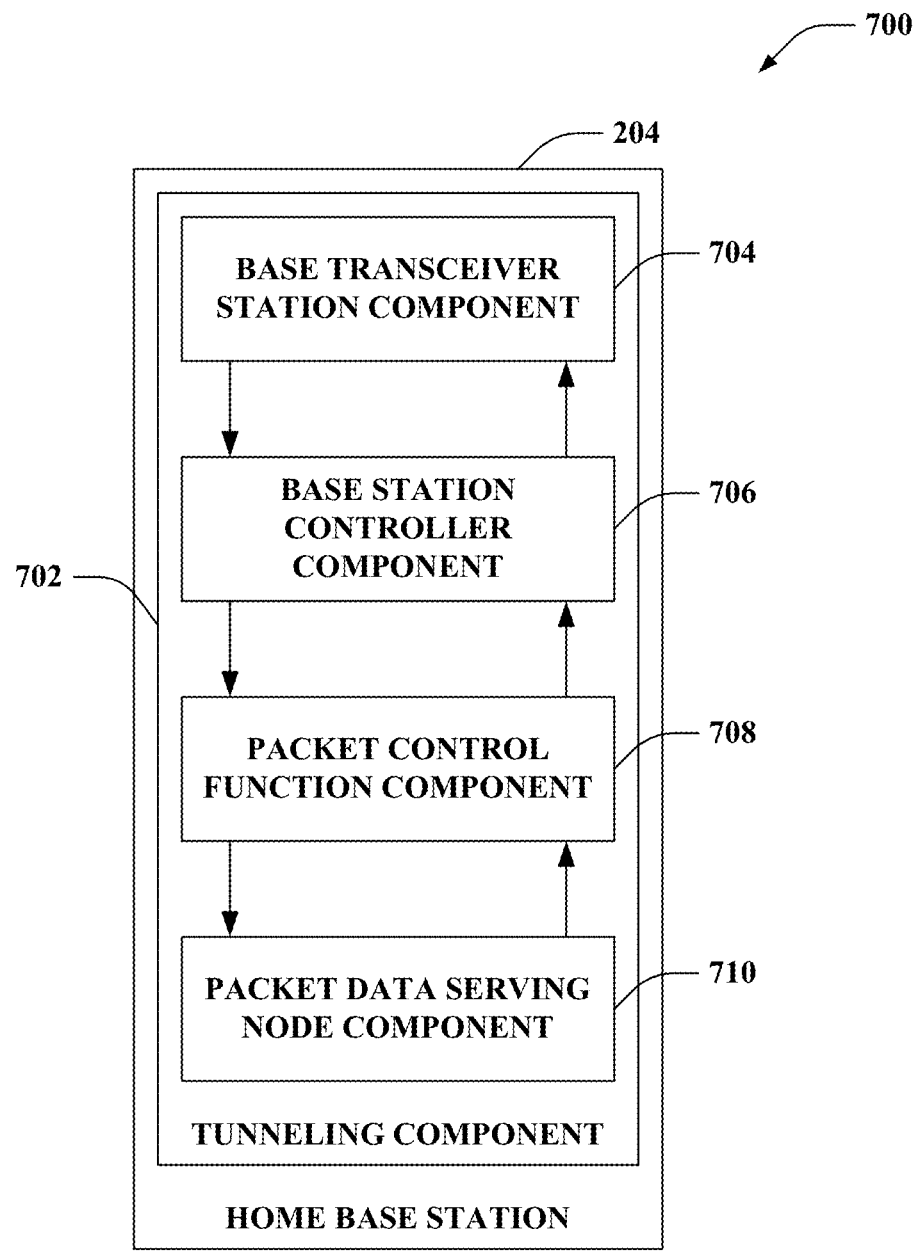
FIG. 7 is an illustration of an example home base station that effectuates tunneling in accordance with various aspects of the subject disclosure.

Turning now to FIG. 7 that provides illustration 700 of home base station 204 in accordance with an aspect of the claimed subject matter. As has been explicated in connection with FIGS. 1 and 2, home base station 204 can have basic functionality similar to those elucidated in connection with access terminals 116 and 122, above, and as such these basic functionalities have been omitted for purposes of conciseness. Nevertheless, as illustrated home base station 204 can have additional capabilities to those already discussed thus far. Home base station 204 can include base transceiver station instrumentalities where a base transceiver station (BTS) component 704 can facilitate wireless communications between multiple access terminals (e.g., access terminal 202) and the core cellular network through utilization of a tunnel extending between home base station 204 and packet data interworking function (PDIF) component 210. Base transceiver station (BTS) component 704 in addition can also include aspects related to encrypting and/or decrypting communications between the various components included within home base station 204 as well as devices and aspects that can comprise the cellular network or system in general.

Further, home base station 204 can also include functionalities associated with base station controllers. Thus, home base station 204 can include base station controller (BSC) component 706 that can provide the intelligence and coordination behind the functionality of base transceiver station (BTS) component 704. Base station controller (BSC) component 706 can, if need be, control a multiplicity of base transceiver station (BTS) components 704 included or associated with home base station 204. Generally, base station controller (BSC) component 706 can handle allocation of radio channels, receives measurements from access terminals (e.g., access terminal 202), and controls handover from and between base transceiver station (BTS) component(s) 704. Additionally and/or alternatively, base station controller (BSC) component 706 can function as a concentrator where disparate low capacity connections from and/or to multiple base transceiver station (BTS) component(s) 704 can be reduced to a smaller number of connections thus mitigating congestion in the tunnel established between home base station 204 and packet data interworking function (PDIF) component 210.

Home base station 204 can further include packet control function (PCF) component 708 that can control transmission of packets between home base station 204 itself and a packet data serving node component situated on the macro cellular network (e.g., packet data serving node 212).

Additionally and/or alternatively, home base station 204 can include functionalities and instrumentalities generally allocated to packet data serving node 212. In this instance, home base station 204 can include packet data serving node component 710 that can be responsible from the establishment, maintenance, and termination of point-to-point (PPP) sessions between home base station 204 and one or more access terminals (e.g., access terminal 202) in communication with home base station 204. Packet data serving node component 710, under this conception or aspect, can assign dynamic Internet Protocol (IP) addresses as well as supporting mobile Internet Protocol (IP) functionality. Inclusion of packet data serving node component 710 with home base station 204, from the perspective of communicating access terminals (e.g., access terminal 202), makes home base station 204 appear to be functionally similar or identical to a typical macro base transceiver station (e.g., macro base transceiver station 218).

As illustrated the functionalities and instrumentalities exposited above in connection with base transceiver station (BTS) component 704, base station controller (BSC) component 706, packet control function (PCF) component 708, and/or packet data serving node component 710, can be ensconced or included within tunneling component 702 which can in turn be associated, included, or integrated with home base station 204.

Figure 8:
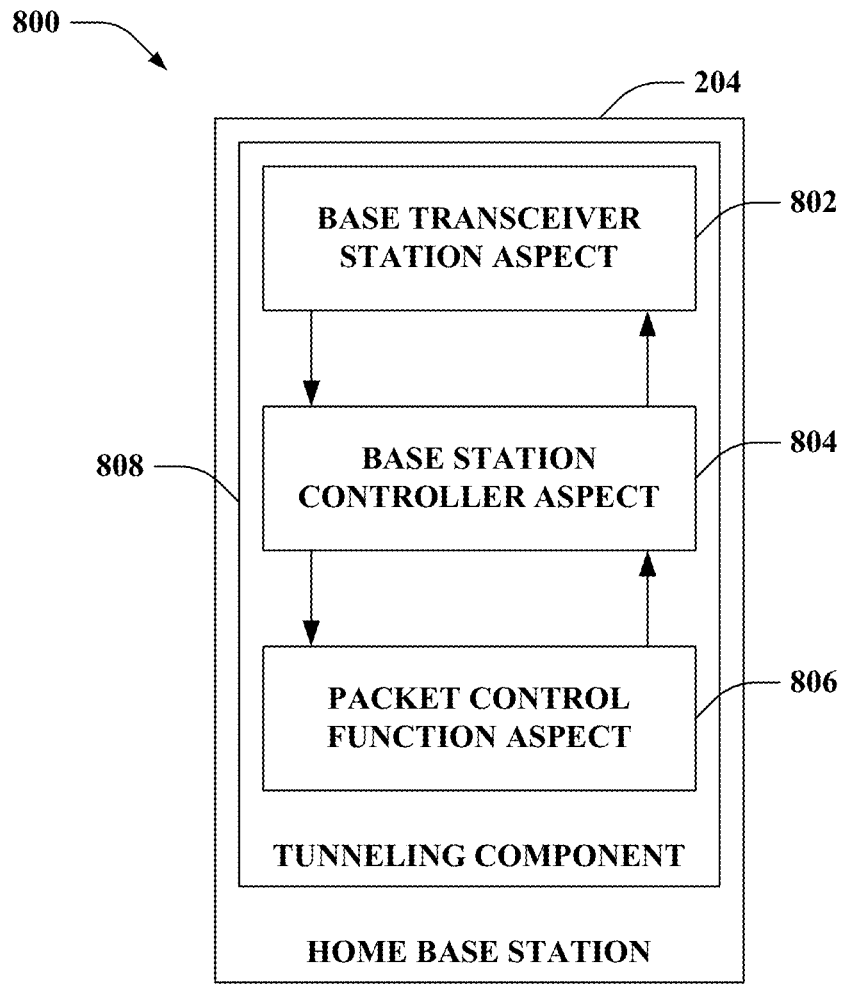
FIG. 8 is a further illustration of an example home base station that effectuates tunneling in accordance with various aspects of the subject disclosure.

FIG. 8 provides illustration 800 of home base station 204 in accordance with a further aspect of the claimed subject matter. As depicted home base station 204 can include base transceiver (BTS) station aspect 802 that can facilitate and effectuate wireless communication between access terminals (e.g., access terminal 202) and the cellular system/network through a tunnel established and connecting home base station 204 with packet data interworking function (PDIF) component 210. Similar to base transceiver station (BTS) component 704, base transceiver station (BTS) aspect 802 can also perform encryption and/or decryption of communications between the many disparate devices and components that can comprise the cellular system/network, as well as, between the various components and/or aspects included or associated with home base station 204.

Additionally, home base station 204 can also include instrumentalities generally associated with base station controllers. Accordingly, home base station 204 can include base station controller (BSC) aspect 804 that can provide the basic intelligence and/or configuration necessary for base transceiver station (BTS) aspect 802 to operate in concert with the plurality of base transceiver station (BTS) aspects (e.g., multiple base transceiver station (BTS) aspects 802) that can be included or associated with home base station 204 (e.g., multiple base transceiver station (BTS) aspects 802 can be utilized where there are a multiplicity of access terminals communicating with, and in the vicinity or purview of, home base station 204). Base station controller (BSC) aspect 804 can allocate radio channels, receive measurements from access terminals within the purview of home base station 204, and control handover from the various base transceiver station (BTS) aspects 802 under its supervision. Moreover, base station controller (BSC) aspect 804 can also function as a consolidator where multiple low capacity connections from and/or to the various base transceiver station (BTS) aspects 802 can be consolidated in order to reduce congestion in the tunnel established between home base station 204 and packet data interworking function (PDIF) component 210.

Additionally, home base station 204 can also include packet control function (PCF) aspect 806 that can control transmission of packets between home base station 204 and a packet data serving node component positioned on the greater cellular system/network (e.g., packet data serving node 212).

Nevertheless, in contrast to the conception disclosed with regard to FIG. 7 the aspect disclosed in FIG. 8, and in particular home base station 204 does not include the functionalities and instrumentalities of the packet data serving node component 710. Rather, home base station 204 relies upon the facilities of packet data serving node 212 disposed within the macro cellular network to provide the point-to-point protocol (PPP) termination point. Thus, the interchange between home base station 204 and the cellular core network employs point-to-point protocol (PPP) inside a tunnel established between home base station 204 and the packet data interworking function (PDIF) component 210 with the consequential effect that communication is now in actuality taking place between home base station 204 and the packet data serving node (PDSN) component 212 rather than being intermediated by packet data interworking function (PDIF) component 210.

As depicted the instrumentalities elucidated above in connection with base transceiver station (BTS) aspect 802, base station controller (BSC) aspect 804, and packet control function (PCF) aspect 806 can be associated with, or included within tunneling component 808, which can be included with home base station 204.

To put FIG. 8 and the functionality of home base station 204 under this aspect in further perspective, the following overview is presented. When an access terminal (e.g., access terminal 202) initiates association with home base station 204, the home base station 204 establishes a tunnel (e.g., IPSec tunnel) with a packet data interworking function 210. Once the tunnel has been established, home base station 204 can utilize high rate packet data (HRPD) point-to-point protocol (PPP) challenge-handshake authentication protocol (CHAP) to authenticate access terminal 202. It should be noted without limitation that in accordance with this aspect of the claimed subject matter the tunnel needs to be established before high rate packet data (HRPD) authentication takes place as the constructed tunnel is typically needed to transport remote authentication dial in user service (RADIUS) messages. Authentication can be via utilization of access, authentication, and accounting (AAA) component 214 situated in the cellular core network. Home base station 204 in accordance with an aspect of the claimed subject matter can be configured with a list of permissible or allowable access terminals (e.g., a list of persisted network address identifiers (NAIs)). Additionally and/or alternatively, a list of persisted network address identifiers (NAIs) can be employed to distinguish different service types (e.g., all users using a certain service can be provided the same network address identifier (NAT)). Other access terminal identifiers can be employed to recognize and authorize users. Where it is ascertained that an access terminal's network address identifier (NAI) is not present on the list of network address identifiers (NAIs) home base station 204 can deny access to such an access terminal. Moreover, where the access terminal's network address identifier (NAI) is found in the list of network address identifiers (NAIs), but the challenge-handshake authentication protocol (CHAP) aspect fails, home base station 204 can also deny access to such an access terminal and home base station 204, without remedial measures, will not serve such an access terminal.

Generally, in accordance with an aspect of the claimed subject matter there can be two levels of authentication, first at the home base station 204 level and secondly at the access, authentication, and accounting (AAA) component 214 level. Security at the home base station 204 level can be handled by a user (e.g., an administrative user) directly adding network address identifiers (NAIs) of those access terminals that will typically utilize home base station 204 to gain access to the cellular core network. Such user interaction can generally take place without loss of integrity to the cellular core network. Security from the perspective of the access, authentication, and accounting (AAA) component 214 level, existing cellular (e.g., 3G) authentication credentials can be employed with the home base station 204 accessing access, authentication, and accounting (AAA) component 214 for the keys necessary for authentication.

Once the access terminal has been authenticated and authorized, home base station 204 can use the access terminal's international mobile subscriber identity (IMSI) to identify and select an appropriate packet data serving node (e.g., packet data serving node 212) with which to establish communications. Typically, the "IMSI modulo N" algorithm can be utilized and performed, where N represents the number of potential packet data serving nodes (PDSNs) reachable by home base station 204. Generally, the number "N" can also be remotely configured and updated (e.g., in cases where the number of potential packet data serving nodes (PDSNs) changes) by the carrier. It should be noted that since the packet control function/radio network controller (PCF/RNC) in wireless access networks also employs the same algorithm to select potential packet data serving nodes (PDSNs) it is likely that after an access terminal transitions to communicate via home base station 204, rather than macro base transceiver station 218, that the same packet data serving node will be selected by home base station 204.

After home base station 204 has identified and/or selected a packet data serving node (e.g., packet data serving node (PDSN) component 212) home base station 204 can employ A11 signaling to establish an A10 connection with packet data serving node (PDSN) component 212. Accordingly, to effectuate this general routing encapsulation (GRE) tunneling needs to be established between packet data serving node (PDSN) component 212 and home base station 204. Where, during the transition by access terminal 202 from macro base transceiver station 218 to home base station 204, the packet data serving node (PDSN) component 212 identified and selected remains the same, there typically is no necessity to perform mobile Internet Protocol (MIP) registration. By obviating the necessity to perform mobile Internet Protocol (MIP) registration the interruption to voice over Internet Protocol (VoIP) service during handoff between wireless access network (WAN) coverage and home coverage (e.g., utilizing communications via home base station 204) can be mitigated to a large extent.

Additional functionalities that can be performed by home base station 204 can further include performing accounting and then forwarding any accounting records to the packet data serving node (PSDN) via an A11 airlink record, supporting network-initiated quality of service (QoS) using existing PDSN-PCF/RNC signaling between packet data serving node (PDSN) component 212 and home base station 204, and using different security associations (SAs) to support different traffic classes between packet data interworking function (PDIF) component 210 and home base station 204. In regard to the latter aspect (e.g., supporting different traffic classes between packet data interworking function (PDIF) component 210 and home base station 204 base at least in part on different security associations (SAs)) multiple A10 connections (e.g., either intra or inter access terminal) with similar quality of service (QoS) characteristics can be mapped to the same IPSec security association (SA) in order to restrict the number of child security associations (SAs) created.

Figure 9:
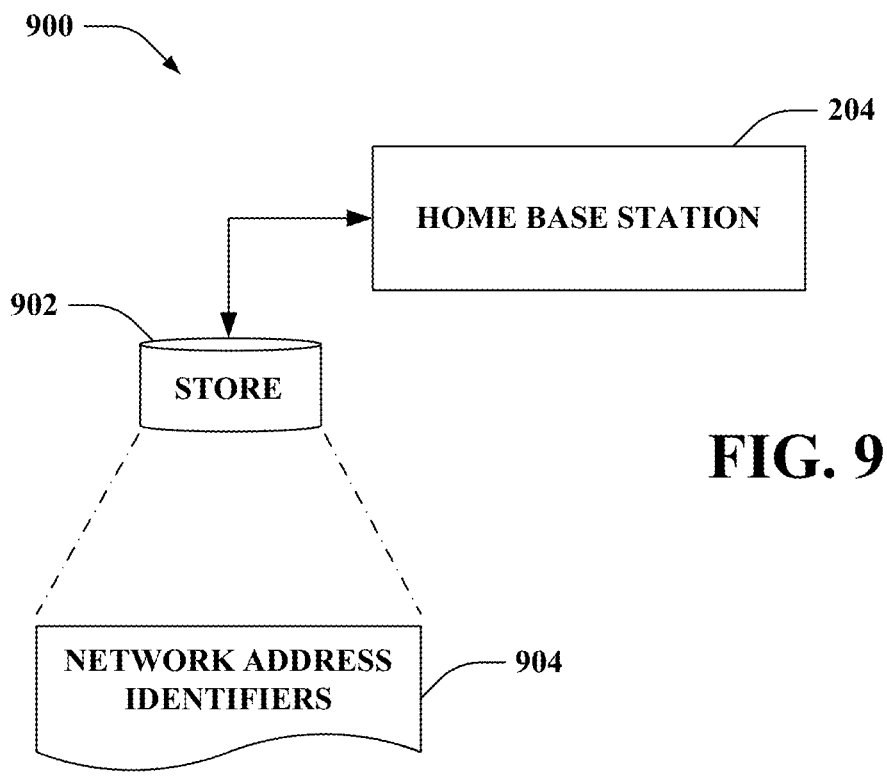
FIG. 9 provides illustration of a home base station that effectuates tunneling in accordance with an aspect of the subject disclosure.

FIG. 9 provides illustration 900 of a further aspect of home base station 204 in accordance with the claimed subject matter. As depicted home base station 204 can be associated with or can include store 902 that can include any suitable data necessary for home base station 204 to facilitate it aims. For instance, store 902 can include network address identifiers (NAIs) 904 associated with one or more access terminals (e.g., access terminal 202) currently in, or that potentially can be in, communication with home base station 204. Additionally, store 902 can also include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that store 902 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 902 of the subject systems and methods is intended to comprise, without being limited to, these and any other suitable types of memory. In addition, it is to be appreciated that store 902 can be a server, a database, a hard drive, and the like.

Figure 10:
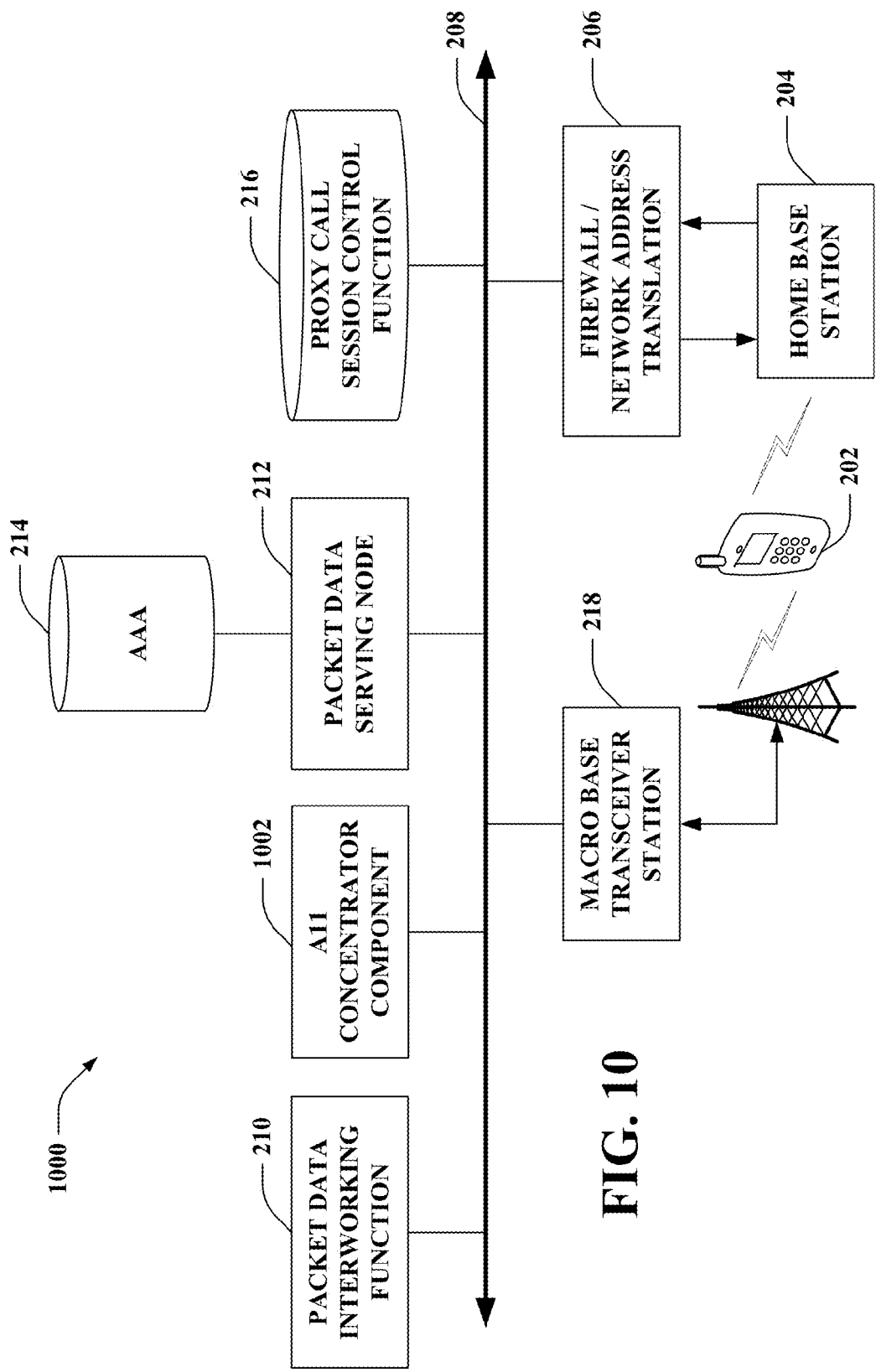
FIG. 10 provides illustration of an example network architecture that includes an A11 concentrator utilized in accordance with an aspect of the subject disclosure.

FIG. 10 illustrates 1000 a further aspect of the claimed subject matter wherein an A11 concentrator component 1002 can be interposed between packet data interworking function (PDIF) component 210 and packet data serving node (PDSN) component 212. As illustrated, A11 concentrator component 1002 can be employed to minimize the number of A11 connections that need to be made to packet data serving node (PDSN) component 212. In accordance with this aspect of the claimed subject matter, A11 concentrator component 1002 can typically maintain a single A11 connection with packet data serving node (PDSN) component 212 thus reducing the impact on packet data serving node (PDSN) component 212 of necessity to maintain and/or monitor numerous A11 connections between itself and devices and/or component that are in communication with it. Accordingly, when an access terminal (e.g., access terminal 202) sends packets through home base station 204 the perception for an individual utilizing the access terminal is that they are communicating directly with packet data serving node (PDSN) component 212 situated within the core cellular network. However in reality access terminal 202 is communicating with home base station 204 that in turn establishes and maintains an A11/A10 interface with A11 concentrator component 1002 which in turn can communicate with packet data serving node 212 through the A11 connection established between it (e.g., A11 concentrator component 1002) and the packet data serving node 212.

In order to facilitate the foregoing functionality, A11 concentrator component 1002 needs to be pre-provisioned with MN-HA keys that can be utilized to communicate with packet data serving node (PDSN) component 212. Moreover, A11 concentrator component 1002 can maintain a mapping between the A11 and A10 connections with disparate home base stations and the A11 and A10 interactions between the disparate home base stations in connection with A11 concentrator component 1002 and packet data serving node (PDSN) component 212. Typically, the mappings established and/or maintained between the A11 and A10 connections with disparate home base stations in connection with A11 concentrator component 1002 can be utilized to route packets to and/or from A11 concentrator component 1002. Furthermore, the established and/or maintained mappings can be dynamically updated based at least in part on when the home base station (e.g., home base station 204) joined the network and when it established the required A10 connections. Additionally, when a previously established A10 connection is no longer being utilized by any access terminal or where no access terminal is associated with the A10 connection, home base station 204 can bring down the A10 connection.

Further with regard to the A11 concentrator component 1002, robust header compression (RoHC) contexts can be addressed directly to packet data serving node (PDSN) 212 when robust header compression (RoHC) is implemented on the A11 concentrator component 1002 as a flow protocol. Conversely, when robust header compression (RoHC) is implemented on the A11 concentrator component 1002 as a route protocol, robust header compression (RoHC) contexts can be targeted to home base station 204.

It should be noted without limitation that while A11 concentrator component 1002 is depicted for the purposes of exposition as a separate and distinct component, it will be appreciated by those ordinarily skilled in the art that A11 concentrator component 1002 can be associated or integrated with packet data interworking function (PDIF) component 210 for purposes of deployment thereby reducing the number of nodes that need to be deployed in the core cellular network. Additionally, it will also be appreciated that similar mechanisms to those employed by A11 concentrator component 1002 can be utilized for A13 type interfaces to transfer sessions between the macro cellular network and networks based on the IEEE 802 standard. Moreover, A11 concentrator component 1002 can be employed to concentrate A16 signaling information intercommunicated between source access nodes (ANs) and target access nodes (ANs) for high rate packet data Inter-AN connected State Session Transfer. Additionally, A11 concentrator component 1002 can further be utilized to concentrate A17, A18, A19, and/or A21 interfaces. As stated supra, A17 interfaces generally carry signaling information between a source access node (AN) and a target access node (AN) to manage resources in support of inter-AN cross-connectivity. A18 interfaces generally transport user traffic (e.g., air interface traffic channel data) for an access terminal between the source access node (AN) and a target RT during cross-connectivity. The A18 interface endpoints are typically set up using an A17 interface. A19 interfaces generally carry remote transmitter (RT)-specific bearer-related cross-connectivity control messages for an access terminal between the access node (AN) and a target remote transmitter (RT). The A19 interface endpoints are normally set up using the A17 interface. A21 interfaces can carry signaling information between a high rate packet data (HRPD) access node (AN) and the indoor wireless system (IWS). A21 interfaces can provide for handoff to 1×.

In accordance with a further aspect, A11 concentrator component 1002 can mask or hide the IP address of a target access node (AN) from the home base station. According to this illustrative aspect, the A11 concentrator component 1002, when it receives a particular request, can query an associated database that maps IP addresses to physical locations and can thereafter find the appropriate target access node to which to forward the message. Once this has been done the home base station and the target access node can do what they need to do based at least in part on the macro cellular specification.

Figure 11:
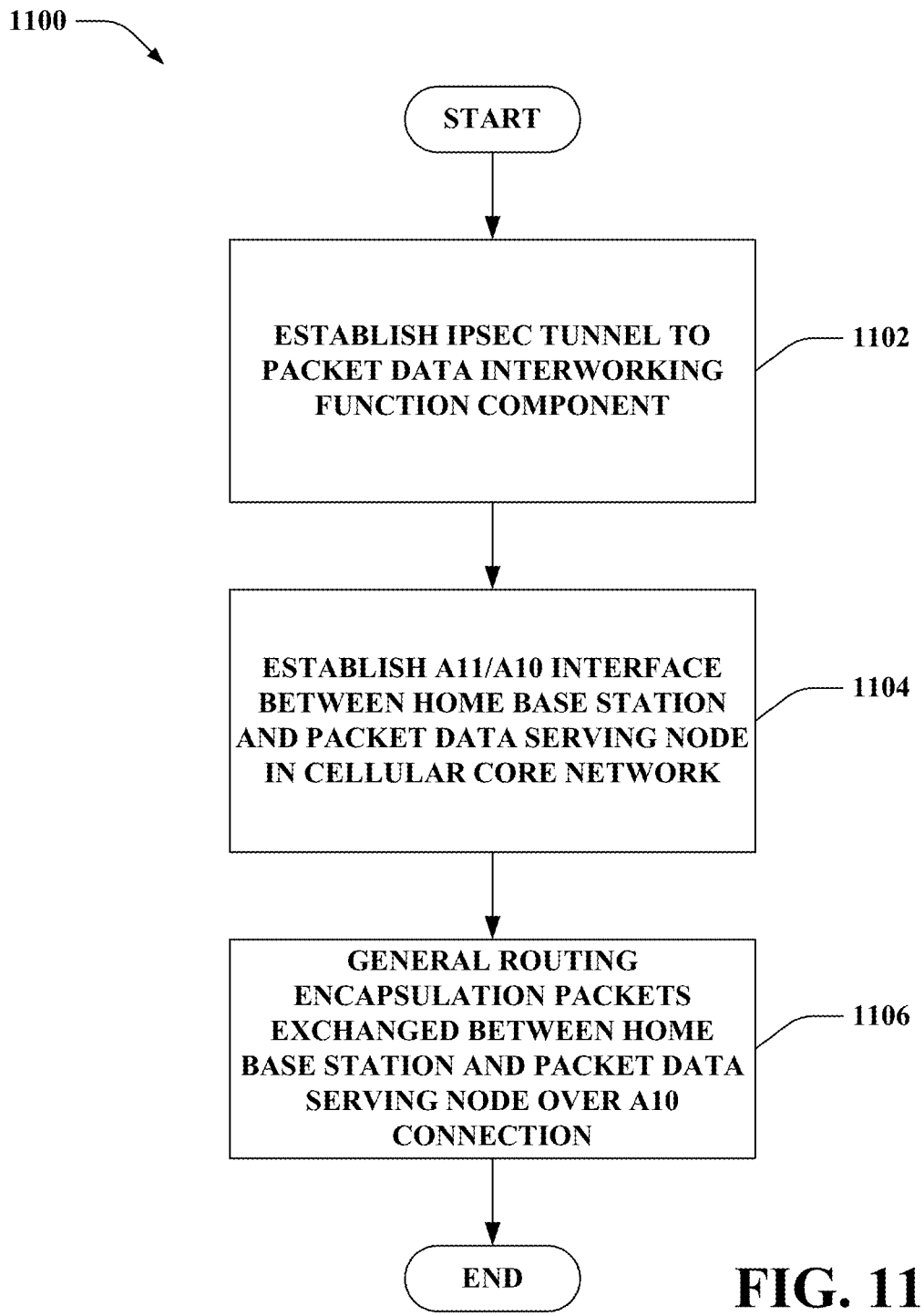
FIG. 11 is an illustration of an example methodology that facilitates utilization of a home base station in a wireless communication environment.

Referring to FIG. 11, a methodology relating to utilizing a home base station in a wireless communications environment is illustrated. While, for purposes of simplicity of explanation, the methodology is shown and described as a series of acts, it is to be understood and appreciated that the methodology is not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 11, illustrated is a methodology 1100 that facilitates employing a home base station in a wireless communications environment. Method 1100 can commence at 1102 where an IPSec tunnel to a packet data interworking function component situated at the boundary of the public Internet and the core cellular communications network can be established. The IPSec tunnel can typically be established when an access terminal initiates association with a home base station. Once the tunnel has been established between the home base station and the packet data interworking function component, the home base station can utilize high rate packet data (HRPD) point-to-point protocol (PPP) challenge-handshake authentication protocol (CHAP) to authenticate the access terminal that initiated association with the home base station. Authentication of access terminal can be effectuated via utilization of an access, authentication, and accounting facility situated in the cellular core network. Additionally and/or alternatively, the home base station can consult a list of persisted network address identifiers (NAIs) to identify access terminals that are allowed to access the core cellular network through the home base station. Where it is ascertained that the access terminal's network address identifier (NAI) is absent from the persisted list of network address identifiers (NAIs) or where the challenge-handshake authentication protocol (CHAP) authentication fails, the home base station can deny access to the access terminal and alternate remedial measures can be implemented.

Once the access terminal has been authenticated, the home base station can employ the access terminal's international mobile subscriber identity (IMSI) to identify and select an appropriate packet data serving node with which to establish communications, after which at 1104, the home base station can employ A11 signaling to establish an A10 connection with the identified packet data serving node. At 1106 regular general routing encapsulation (GRE) tunnel packets can be exchanged between the home base station and the packet data serving node. It should be noted that typically the access terminal retains the associated with the core cellular network when it has currently active services, even when it is within the purview of the home base station, but when the previously active service are terminate, the access terminal will associate itself with the home base station.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
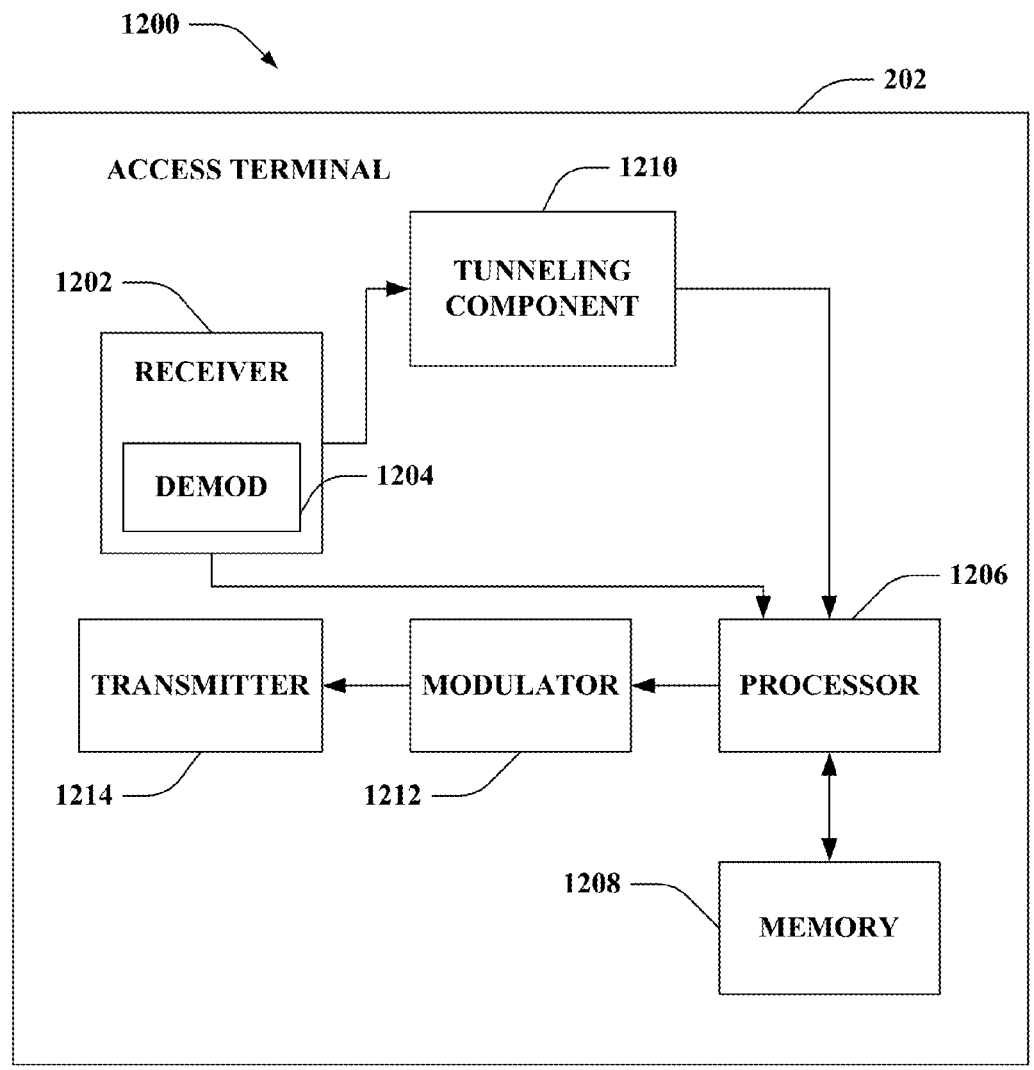
FIG. 12 is a further illustration of an example access terminal that establishes a tunnel through a home base station in accordance with various aspects of the subject disclosure.

FIG. 12 is an illustration 1200 of an access terminal 202 that obtains and/or utilizes a home base station in a wireless communication system. Access terminal 202 comprises a receiver 1202 that receives a signal from, for instance, a receive antenna (not shown), and performs typical actions thereon (e.g., filters, amplifies, downconverts, etc.) the received signal and digitizes the conditioned signal to obtain samples. Receiver 1202 can be, for example, an MMSE receiver, and can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1214, a processor that controls one or more components of access terminal 202, and/or a processor that both analyzes information received by receiver 1202, generates information for transmission by transmitter 1214, and controls one or more components of access terminal 202.

Access terminal 202 can additionally comprise memory 1208 that is operatively coupled to processor 1206 and that can store data to be transmitted, received data, and any other suitable information related to performing the various actions and functions set forth herein. For instance, memory 1208 can store group-specific signaling constraints employed by one or more base stations. Memory 1208 can additionally store protocols and/or algorithms associated with identifying signaling constraints used for communicating resource block assignments and/or employing such signaling constraints to analyze received assignment messages.

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Receiver 1202 is further operatively coupled to a tunneling component 1210 which can be substantially similar to tunneling component 602 of FIG. 6. Tunneling component 1210 can be employed to establish a tunnel extending from access terminal 202 to a packet data interworking function component situated at the contiguity between a core cellular communications network and the Internet at large. Access terminal 202 still further comprises a modulator 1212 and a transmitter 1214 that transmits the signal to, for instance, a home base station, another access terminal, etc. Although depicted as being separate from the processor 1206, it is to be appreciated that tunneling component 1210 and/or modulator 1212 can be part of processor 1206 or a number of processors (not shown).

Figure 13:
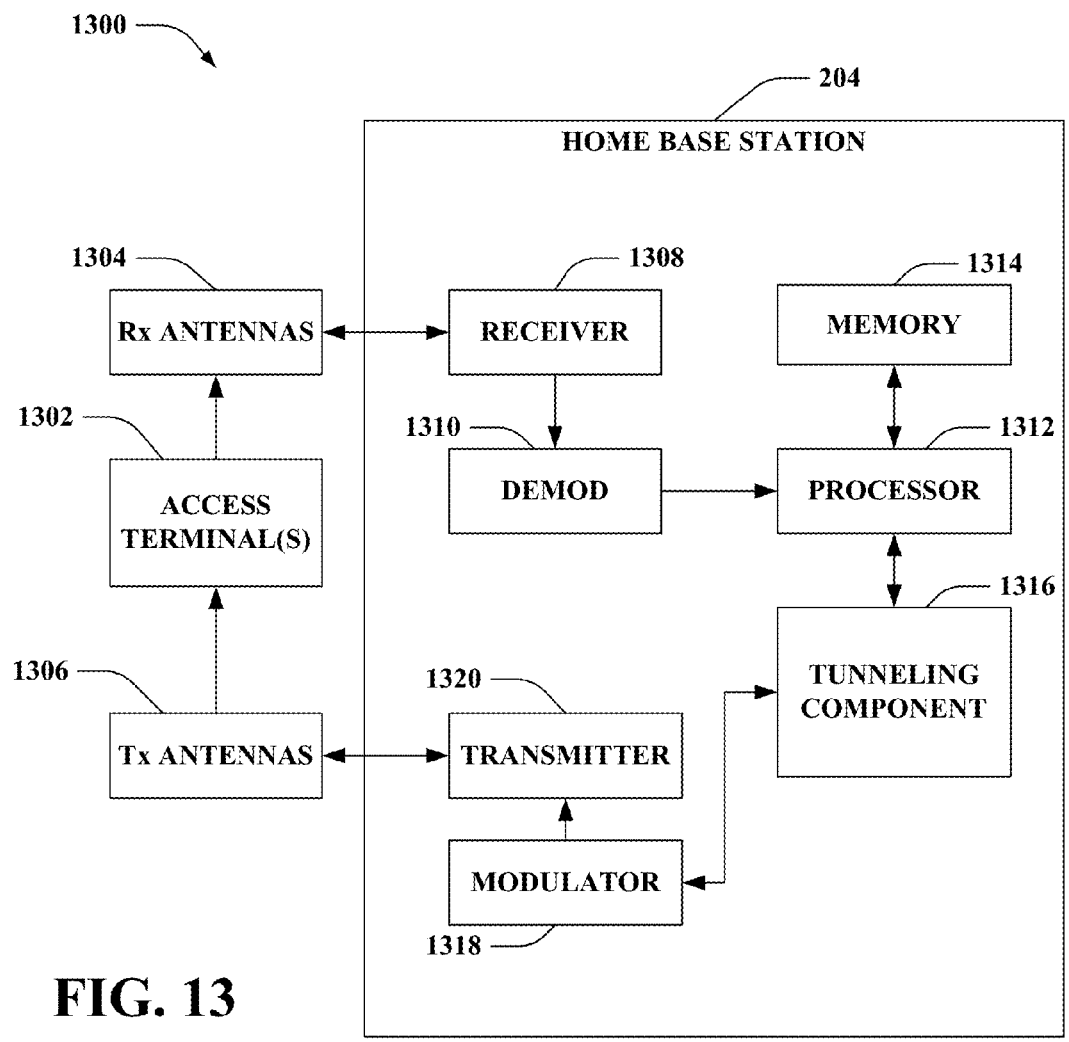
FIG. 13 provides illustration of an example home base station that establishes a tunnel to a packet data interworking function in accordance with various aspects of the subject disclosure.

FIG. 13 is an illustration of a system 1300 that facilitates utilizing a home base station in a wireless communication environment. System 1300 comprises a home base station 204 (e.g., access point, . . . ) with a receiver 1308 that receives signal(s) from one or more access terminals 1302 through a plurality of receive antennas 1304, and a transmitter 1320 that transmits to the one or more access terminals 1302 through a transmit antenna 1306. Receiver 1308 can receive information from receive antennas 1304 and is operatively associated with a demodulator 1310 that demodulates received information. Demodulated symbols are analyzed by a processor 1312 that can be similar to the processor described above with regard to FIG. 12, and which is coupled to a memory 1314 that stores data to be transmitted to or received from access terminal(s) 1302 (or a disparate base station (not shown)) and/or any other suitable information related to performing the various actions and functions set forth herein. Processor 1312 is further coupled to a tunneling component 1316 that establishes a tunnel extending from home base station 204 to a packet data interworking function component situated at the contiguity between a core cellular communications network and the Internet. Further, tunneling component 1316 can provide information to be transmitted to a modulator 1318. Modulator 1318 can multiplex a frame for transmission by a transmitter 1320 through antennas 1306 to access terminal(s) 1302. Although depicted as being separate from the processor 1312, it is to be appreciated that tunneling component 1316 and/or modulator 1318 can be part of processor 1312 or a number of processors (not shown).

Figure 14:
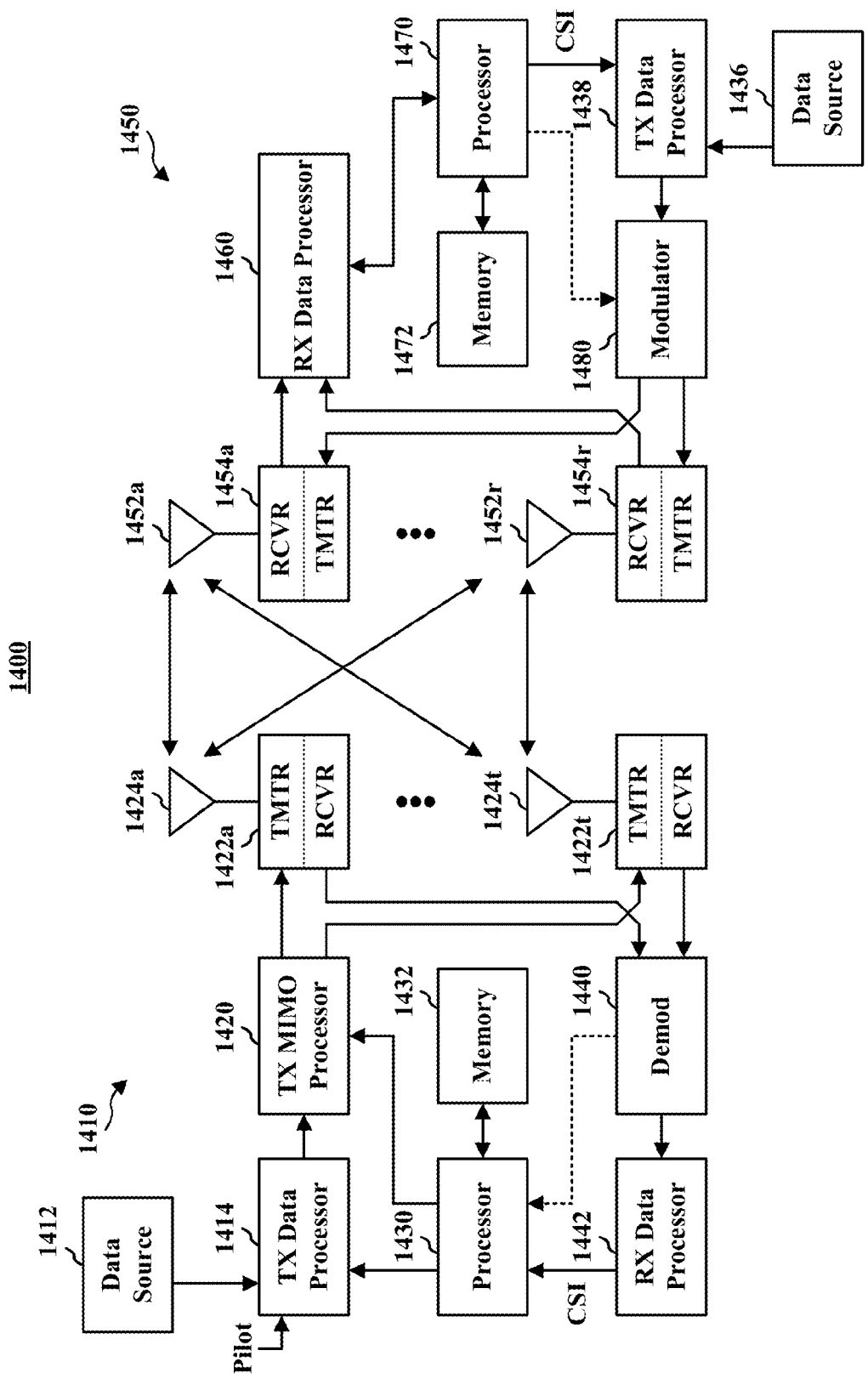
FIG. 14 is an illustration of an example system that facilitates allocating resource blocks to access terminal(s) via employing a flexible signaling scheme in a wireless communication environment.

FIG. 14 shows an example wireless communication system 1400. The wireless communication system 1400 depicts one home base station 1410 and one access terminal 1450 for sake of brevity. However, it is to be appreciated that system 1400 can include more than one home base station and/or more than one access terminal, wherein additional home base stations and/or access terminals can be substantially similar or different from example home base station 1410 and access terminal 1450 described below. In addition, it is to be appreciated that home base station 1410 and/or access terminal 1450 can employ the systems (FIGS. 1-10) and/or method (FIG. 11) described herein to facilitate wireless communication there between.

At home base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At access terminal 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at home base station 1410.

A processor 1470 can periodically determine which available technology to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At home base station 1410, the modulated signals from access terminal 1450 are received by antennas 1424, conditioned by receivers 1422, demodulated by a demodulator 1440, and processed by a RX data processor 1442 to extract the reverse link message transmitted by access terminal 1450. Further, processor 1430 can process the extracted message to determine which precoding matrix to use for determining the beamforming weights.

Processors 1430 and 1470 can direct (e.g., control, coordinate, manage, etc.) operation at home base station 1410 and access terminal 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
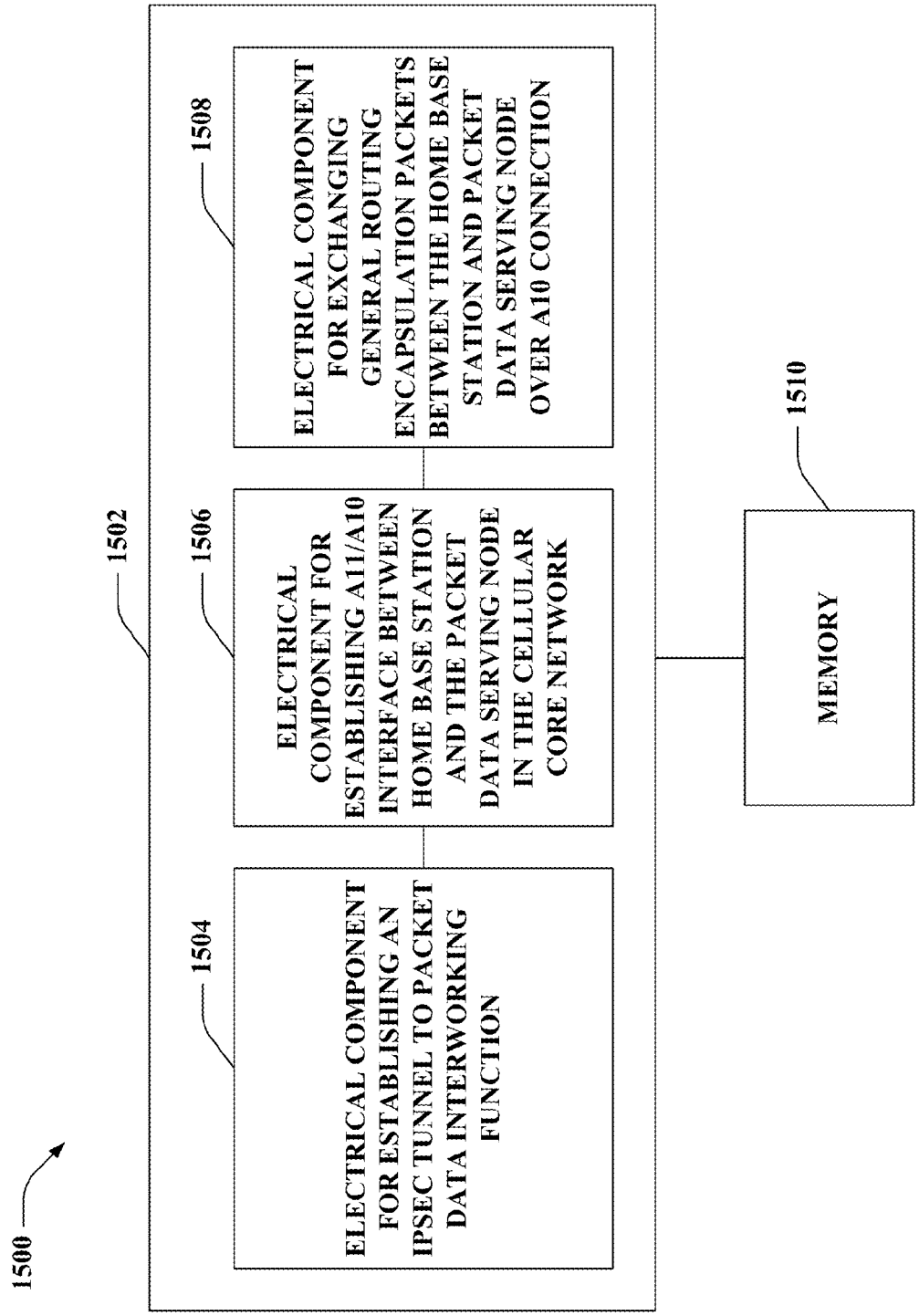
FIG. 15 is an illustration of an example system that enables establishing a tunnel linking a home base station with a packet data interworking function situated at the contiguity between the public Internet and a core cellular wireless communication environment.

Turning to FIG. 15, illustrated is a system 1500 that enables utilizing a home base station in a wireless communication environment. System 1500 can reside within a home base station, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for establishing an IPSec tunnel to a packet data interworking function 1504. Further, logical grouping 1502 can include an electrical component for establishing A11/A10 interfaces between a home base station and a packet data serving node situated in a core cellular communications network 1506. Moreover, logical grouping 1502 can include an electrical component for exchanging general routing encapsulation packets between the home base station and the packet data serving node 1508. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for employing a home base station in a wireless communication environment, comprising:
    establishing an internet protocol security (IPSec) tunnel between the home base station and a packet data interworking function;
    establishing a connection with a packet data serving node, wherein establishing the connection with the packet data serving node comprises:
        identifying the packet data serving node based on an international mobile subscriber identity (IMSI) associated with an access terminal, and
        employing A11 signaling to establish an A10 connection with the packet data serving node; and
    exchanging packets between the home base station and the packet data serving node over the connection.

2. The method of claim 1, further comprising initiating association with an access terminal, wherein the IPSec tunnel is established in response to initiating association with the access terminal.

3. The method of claim 1, further comprising authenticating an access terminal associated with the home base station.

4. The method of claim 3, wherein authenticating comprises utilizing a high rate packet data (HRDP) point-to-point protocol (PPP) challenge-handshake authentication protocol (CHAP) through the IPSec tunnel.

5. The method of claim 3, wherein authenticating comprises communicating with an access, authentication, and accounting (AAA) facility through the IPSec tunnel.

6. The method of claim 3, wherein authenticating comprises determining if a network address identifier (NAI) for the access terminal is included in a list of persisted NAIs on the home base station.

7. The method of claim 1, wherein the packets comprise general routing encapsulation (GRE) tunneling packets.

8. A wireless communications apparatus, comprising:
    a memory that retains instructions related to:
        establishing an internet protocol security (IPSec) tunnel between a home base station and a packet data interworking function,
        establishing a connection with a packet data serving node, wherein the instructions related to establishing the connection with the packet data serving node comprise instructions related to:
            identifying the packet data serving node based on an international mobile subscriber identity (IMSI) associated with an access terminal, and
            employing A11 signaling to establish an A10 connection with the packet data serving node; and
        exchanging packets between the home base station and the packet data serving node over the connection; and
    a processor, coupled to the memory, configured to execute the instructions retained in the memory.

9. The wireless communications apparatus of claim 8, wherein the memory further retains instructions related to initiating association with an access terminal, wherein the IPSec tunnel is established in response to initiating association with the access terminal.

10. The wireless communications apparatus of claim 8, wherein the memory further retains instructions related to authenticating an access terminal associated with the home base station.

11. The wireless communications apparatus of claim 10, wherein authenticating comprises:
utilizing a high rate packet data (HRDP) point-to-point protocol (PPP) challenge-handshake authentication protocol (CHAP) through the IPSec tunnel;
communicating with an access, authentication, and accounting (AAA) facility through the IPSec tunnel; or
determining if a network address identifier (NAI) for the access terminal is included in a list of persisted NAIs on the home base station.

12. The wireless communications apparatus of claim 8, wherein the packets comprise general routing encapsulation (GRE) tunneling packets.

13. A non-transitory computer-readable medium, comprising:
code for causing a computer to establish an internet protocol security (IPSec) tunnel between a home base station and a packet data interworking function;
code for causing a computer to establish a connection with a packet data serving node, wherein the code for causing a computer to establish the connection with the packet data serving node comprises:
code for causing a computer to identify the packet data serving node based on an international mobile subscriber identity (IMSI) associated with an access terminal, and
code for causing a computer to employ A11 signaling to establish an A10 connection with the packet data serving node; and
code for causing a computer to exchange packets between the home base station and the packet data serving node over the connection.

14. The non-transitory computer-readable medium of claim 13, wherein the computer-readable medium further comprises code for causing a computer to initiate association with an access terminal, wherein the IPSec tunnel is established in response to initiating association with the access terminal.

15. The non-transitory computer-readable medium of claim 13, wherein the computer-readable medium further comprises code for causing a computer to authenticate an access terminal associated with the home base station.

16. The non-transitory computer-readable medium of claim 15, wherein the code for causing a computer to authenticate comprises:
code for causing a computer to utilize a high rate packet data (HRDP) point-to-point protocol (PPP) challenge-handshake authentication protocol (CHAP) through the IPSec tunnel;
code for causing a computer to communicate with an access, authentication, and accounting (AAA) facility through the IPSec tunnel; or
code for causing a computer to determine if a network address identifier (NAI) for the access terminal is included in a list of persisted NAIs on the home base station.

17. The non-transitory computer-readable medium of claim 13, wherein the packets comprise general routing encapsulation (GRE) tunneling packets.

\* \* \* \* \*